(12) United States Patent
Greeb et al.

(10) Patent No.: US 7,059,418 B2
(45) Date of Patent: Jun. 13, 2006

(54) PRESSURIZED SEAL ARRANGEMENT

(75) Inventors: Kevin E. Greeb, Fort Collins, CO (US); Jeffrey T. Stewart, Greeley, CO (US); Wade A. Burdick, Windsor, CO (US); Gary M. Bowman, Loveland, CO (US)

(73) Assignee: Woodward Governor Company, Fort Collins, CO (US)

( * ) Notice: Subject to any disclaimer, the term of this patent is extended or adjusted under 35 U.S.C. 154(b) by 252 days.

(21) Appl. No.: 10/715,708

(22) Filed: Nov. 18, 2003

(65) Prior Publication Data

US 2004/0135112 A1     Jul. 15, 2004

Related U.S. Application Data

(63) Continuation-in-part of application No. 10/340,017, filed on Jan. 10, 2003, now Pat. No. 6,953,084.

(51) Int. Cl.
*E21B 34/02* (2006.01)

(52) U.S. Cl. .................. 166/387; 166/97.1; 166/332.1; 166/334.4; 166/386

(58) Field of Classification Search ..................... None
See application file for complete search history.

(56) References Cited

U.S. PATENT DOCUMENTS

| 1,593,533 | A | 7/1926 | Joyce |
| 1,779,938 | A | 10/1930 | Joyce |
| 1,835,887 | A | 12/1931 | Mackey |
| 2,427,656 | A | 9/1947 | Blom |
| 3,334,906 | A | 8/1967 | Arnold |

(Continued)

*Primary Examiner*—Zakiya W. Bates
(74) *Attorney, Agent, or Firm*—Reinhart Boerner Van Deuren P.C.

(57) ABSTRACT

A pressurized sealing arrangement suited for providing a seal between a valve stem and a valve body is provided. The sealing arrangement includes a piston that is restrained in and statically sealed to the valve body and which surrounds the valve stem. Contained within the piston is an annular seal packing that includes two sealing elements spaced apart by a spacer element. The piston includes a face acted upon by a process fluid flowing through the valve body in such a manner that the piston exerts pressure upon a lubricant cavity. The lubricant cavity is in fluid communication with the seal packing such that lubricant contained therein forms a lubricant ring around the stem. Lubricant is also thereby supplied to sealing elements of the packing seal. To prevent contamination of the seal packing, a removable cover is provided that encloses the piston and seal packing.

31 Claims, 21 Drawing Sheets

U.S. PATENT DOCUMENTS

| | | | |
|---|---|---|---|
| 3,648,718 A * | 3/1972 | Curran | 137/269 |
| 3,770,247 A * | 11/1973 | Nelson | 251/282 |
| 3,774,877 A | 11/1973 | Robertson | |
| 3,830,306 A | 8/1974 | Brown | 166/53 |
| 3,954,348 A | 5/1976 | Renaud | |
| 3,958,592 A * | 5/1976 | Wells et al. | 137/315.3 |
| 4,289,445 A | 9/1981 | Sims | |
| 4,354,664 A | 10/1982 | Taylor et al. | |
| 4,384,820 A | 5/1983 | Sims | |
| 4,505,115 A | 3/1985 | Arbuckle | |
| 4,509,897 A | 4/1985 | Sims | |
| 4,702,269 A | 10/1987 | Schuler | |
| 4,915,579 A | 4/1990 | Whittier et al. | |
| 4,922,719 A | 5/1990 | Arbuckle | |
| 4,960,039 A | 10/1990 | Robertson | |
| 5,211,532 A | 5/1993 | Thompson | |
| 5,474,307 A | 12/1995 | DeBiasse et al. | |
| 5,519,295 A | 5/1996 | Jatnieks | 318/453 |
| 5,562,406 A | 10/1996 | Ooka et al. | |
| 6,161,835 A | 12/2000 | Arbuckle | 277/320 |
| 6,162,031 A | 12/2000 | Tremoulet, Jr. | |

* cited by examiner

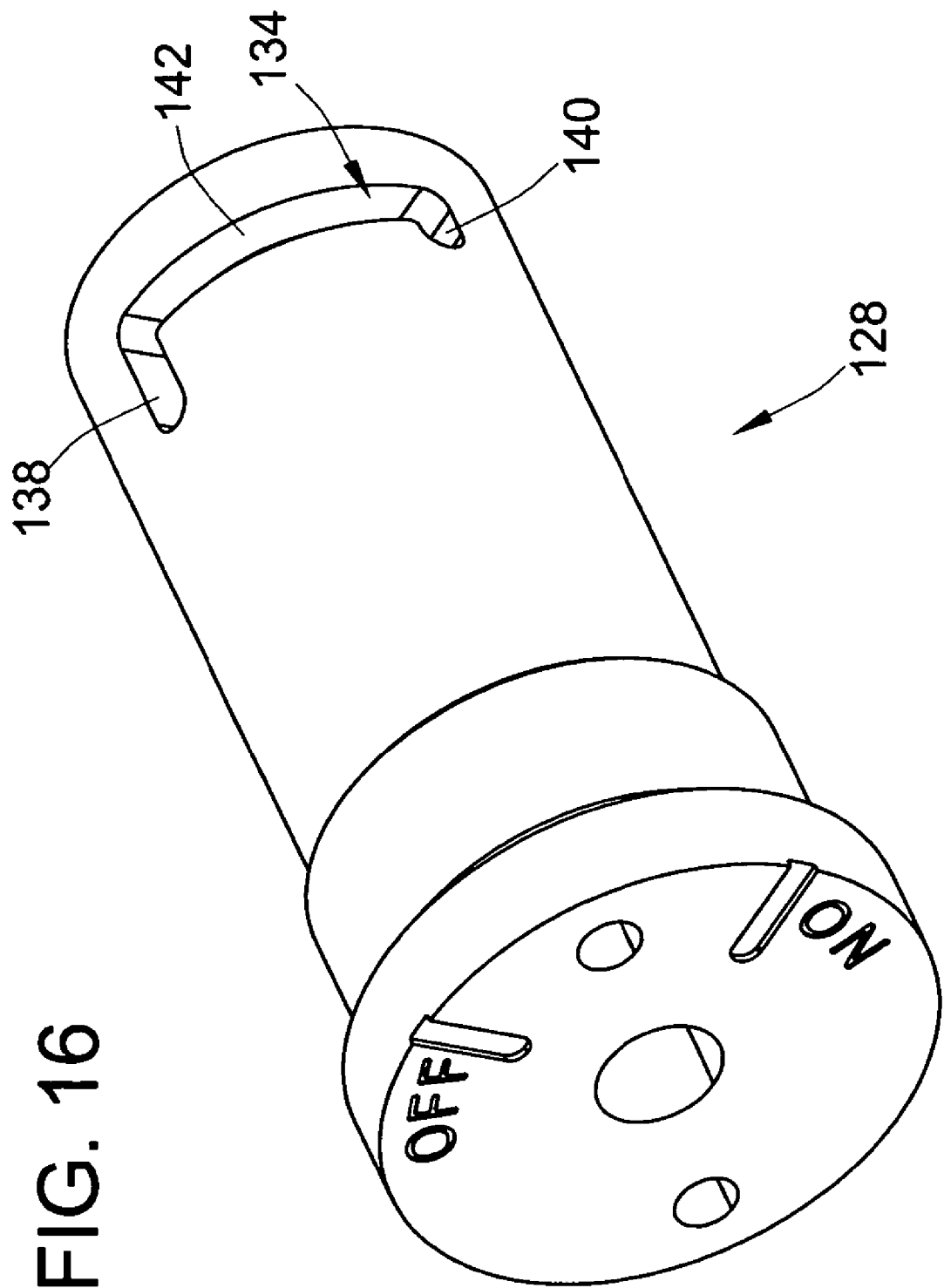

PRESSURIZED SEAL ARRANGEMENT

CROSS-REFERENCES TO RELATED APPLICATIONS

This application is a continuation-in-part of U.S. application Ser. No. 10/340,017 filed on Jan. 10, 2003 now U.S. Pat. No. 6,953,084.

FIELD OF THE INVENTION

The present invention relates generally to seals and sealing, and more particularly to pressurized seals for sealing a reciprocating stem or shaft. The present invention finds particular utility in regulating values in which leakage of the process fluid being regulated is to be minimized.

BACKGROUND OF THE INVENTION

Flow regulating valves are devices that can be adjusted to restrict or increase the flow of a fluid through a conduit. Such valves are generally well known in the art and have many practical applications. For example, in the commercial natural gas production industry, flow-regulating valves are commonly used to vary the flow of natural gas through a network of gas collection pipes. The network of collection pipes often will connect and branch together tens to hundreds of natural gas ground wells in a localized geographic region. The individual wells will feed natural gas through the network of gas collection pipes to a common output location. Often, the desired natural gas output is less than the maximum production capacity of the several wells combined. Such demands can change due to cyclical seasonal trends and for other economic reasons. This creates a need for regulating and monitoring natural gas production from each well to control the supply.

To regulate the production output of each individual well, the branch collection pipe for each individual well typically includes a flow-regulating valve and a gas flow sensor arranged in fluid series. The gas flow sensor indicates the amount of natural gas that flows through the collection pipe. The regulating control valve provides a variable degree of opening that forms a restriction orifice in the collection pipe and thereby sets the natural gas flow rate in the collection pipe.

To adjust the restriction orifice within the collection pipe, the flow-regulating valve is typically a movable/positionable type of valve such as a linearly translatable valve. A valve of this design generally includes a valve body through which a flow passage is disposed. Other components include a plug member located within the flow passage and an elongated valve stem attached to the plug member and that passes through a valve bonnet. The plug member can be linearly translated toward or away from a valve seat within the flow passage between a fully opened position and a fully closed position, and intermediate positions therebetween. The plug member blocks all flow when in the fully closed position and allows for maximum flow when in the fully opened position.

To linearly translate the plug member towards and away from the valve seat, the valve stem can be connected to an actuator typically located adjacent the valve bonnet and which imparts linear translation motion to the valve stem. Accordingly, the valve stem will have to move with respect to the valve housing that it passes into. To prevent the unnecessary loss of process fluids passing through the valve, it is desirable that the intersection between the reciprocating valve stem and the valve bonnet into which the stem passes is well sealed. This is especially desirable where the process fluid is a flammable natural fluid that can potentially produce an explosion or some other poisonous or environmentally harmful process fluid.

One device and sealing method that has been proposed for sealing a linearly moving valve stem is a pressurized seal arrangement of the type taught in, for example, U.S. Pat. No. 6,161,835 to Donald Arbuckle. In pressurized seal arrangements of the type disclosed in Arbuckle, pressure from the process fluid is used to create a dynamic seal preventing leakage from valve stem and pressurizing piston intersection. Specifically, the device uses an intermediary fluid or lubricant onto which the pressure of the flowing process fluid can be imparted. The pressurized intermediary fluid is thereby forced toward the stem thus creating a fluid seal around the stem that prevents leakage of the process fluid to the environment. Additional sealing may be provided by the inclusion of other sealing elements surrounding the stem that are lubricated by the pressurized intermediary fluid. Improvements to tis prior art design are presented herein.

BRIEF SUMMARY OF THE INVENTION

The present invention is directed toward a novel pressurized seal arrangement for a stem that is simple to assemble and that is easy to service. The pressurized seal arrangement can be implemented in, for example, a well-head regulating valve attached to a collection pipe through which process fluids, such as natural gas, may pass. The regulating valve may have a valve housing that defines a flow passage therethrough. An elongated stem extends from a valve plug member located along the flow passage through the valve housing to an actuator that can impart a translating motion to the valve stem. Linear translation of the plug member toward and away from a valve seat formed in the flow passage results in blocking or permitting flow through the valve.

To provide the pressurized seal between the valve bonnet and the valve stem, the stem extends through and is surrounded by an annular piston. The piston and the bonnet in turn are restrained and statically sealed to the valve body so as to prevent leakage of the process fluid. The piston separates the process fluids in the flow passage from a lubricant cavity located between the piston and the bonnet. The piston also includes a sleeve portion that surrounds and extends axially along the stem and that is received in the bonnet. Attached to an outside surface of the bonnet can be the actuator.

Contained within the sleeve portion is a seal packing that fits around valve stem. The seal packing includes two sealing elements, such as pressure and spring actuated cup seals, that are axially spaced apart by the spacer element. The seal packing can also include seal retaining washers located between the sealing elements and the spacer element and a PTFE guide bushing. To axially retain the seal packing in the sleeve portion, a snap ring snaps into a groove formed in the sleeve. Also included may be a retaining washer between the PTFE guide bushing and the snap ring. The spacer element includes ports that are in fluid communication with lubricant stored in the lubricant cavity. Because the lubricant cavity is pressurized by the process fluid impinging on the piston, pressurized lubricant forms a ring that acts as a fluid seal around the valve stem between the first and second sealing elements. The lubricant also lubricates the seal elements to facilitate their dynamic sealing effect.

In another aspect of the present invention, to check the level of the lubricant in the sealant cavity, the sleeve can be received in the bonnet such that the sleeve end is flush with the top surface of the bonnet. Leakage of lubricant from the sealant cavity will cause axial motion of the piston with respect to the bonnet such that the end of the piston sleeve will rise above the top surface of the bonnet. To prevent dust or other containments from affecting the seal packing, a cover can be placed adjacent the top surface of the bonnet enclosing the seal packing.

An advantage of the present invention is that a pressurized seal is created between a valve bonnet and a linearly translating stem passing through the valve housing such that process gases flowing through a valve body are sealed therein. Another advantage is that the pressurized seal is arranged in such a manner that simplifies its construction and maintenance. These and other advantages, as well as additional features, will become apparent from the description of the invention provided herein.

The present invention will be described in association with a valve application although it will be appreciated that the claimed invention of certain claims may have other applications.

Other advantages of the invention, as well as additional inventive features, will be apparent from the description of the invention provided herein.

BRIEF DESCRIPTION OF THE DRAWINGS

FIG. 16 is an isometric view of the brake housing.

DETAILED DESCRIPTION OF THE INVENTION

Figure 1:
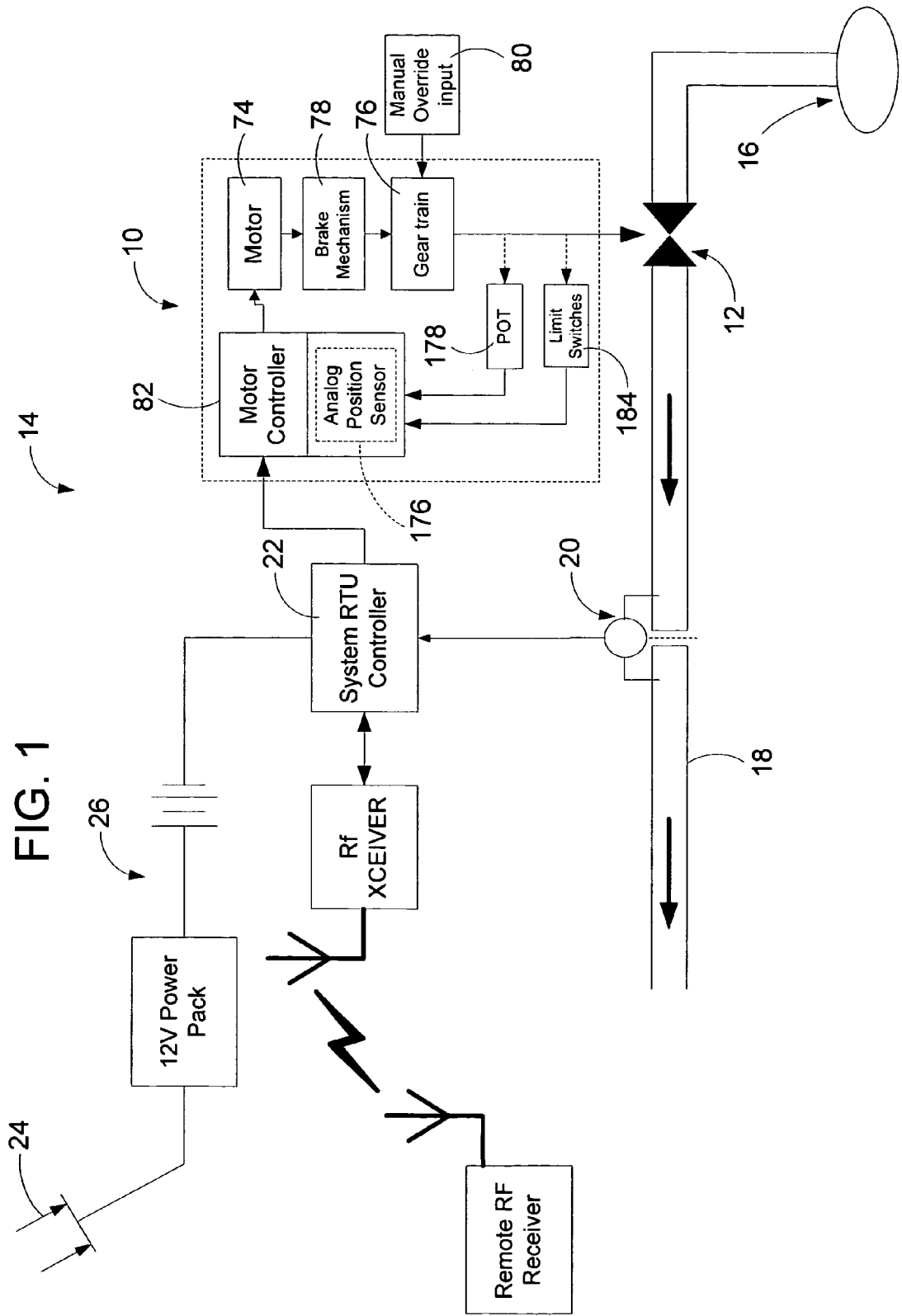
FIG. 1 is a schematic plan view of a wellhead system incorporating the electrically actuated valve according to a preferred embodiment of the present invention.
Figure 2:
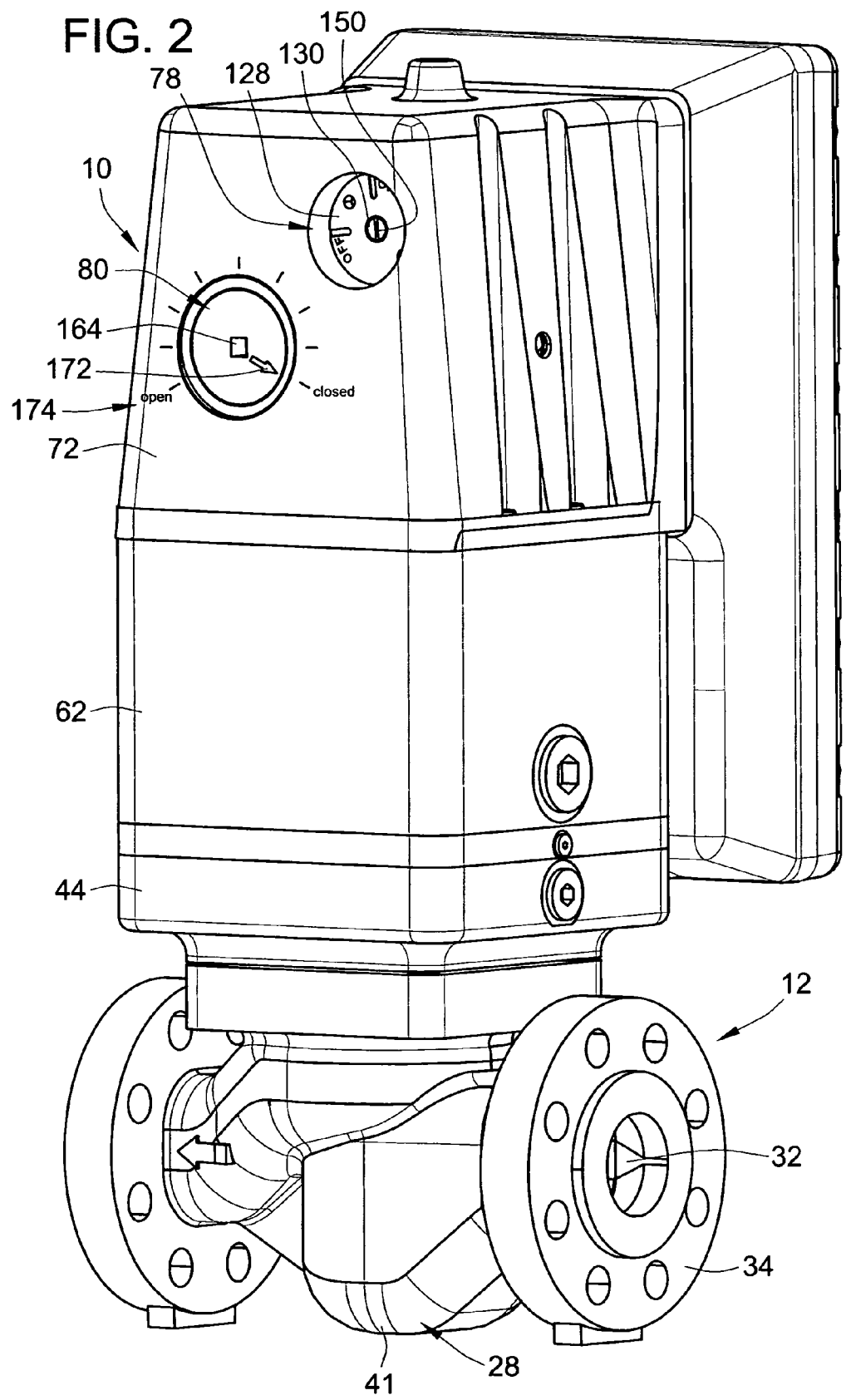
FIG. 2 is an isometric view of the electrically actuated valve shown in FIG. 1.

An electrical actuator 10 that is particularly suited for a well-head valve 12 is shown throughout the figures in accordance with a preferred embodiment of the present invention. FIG. 1 illustrates a natural gas well production system 14 which is an exemplary application and operational environment for the electrical actuator 10. As shown in FIG. 1, the well-head valve 12 regulates the production output of a natural gas production well 16 through a collection pipe 18. The well head valve 12 is mounted in the collection pipe 18 in fluid series with a gas flow sensor 20. The degree of opening of the well head valve 12 and the natural gas pressure of the well 16 (which typically ranges between about 10–900 psi or even higher for most production wells) determine the natural gas flow rate through the collection pipe 18. The gas flow sensor 20 measures the amount of natural gas that flows through the pipe 18. The gas flow sensor 20 provides electrical feedback representative of the sensed flow rate to an electronic controller 22 for closed loop control over the electrical actuator 10 and well-head valve 12.

Since the well 16 may be located remote from a commercially available electrical power supply, the system 14 is shown to include a local electrical power supply which typically comprises a small solar panel 24 and battery 26. The solar panel 24 generates a small electrical power supply and the battery 26 stores the electrical power supply. Advantageously, the electrical actuator 10 can replace pneumatic actuation systems without needing any additional power or electrical generation, using only the existing local electrical power supply if desired. As such, additional cost need not be wasted on electrical generation, and the present invention may be employed as a retrofit device to replace pneumatic actuating systems at existing well-head valves. However, it should be noted that in some instances that some additional expansion of the electrical generation or storage capabilities may be desirable.

In FIG. 1, two separate controllers 22, 82 are indicated, but these may be integrated if desired into a single controller assembly. To provide for both retrofit and new systems, typically two separate controllers 22, 82 will be used.

The well-head valve 12 may be a linearly translatable valve, a rotary valve or other movable/positionable valve. Referring to FIGS. 2–4 and 8, the illustrated well-head valve 12 is shown as the linear type comprising a valve housing 28 and linearly translatable valve member 20. The valve housing 28 includes a valve body 41 defining a flow passage 32. The flow passage 32 extends between and through a pair mounting flanges 34 on ends of the valve body 41. The mounting flanges 34 are adapted to mount the wellhead valve 12 on a collection pipe 18. The valve member 20 may include separate components including a plug member 36 and an elongate valve stem 38 extending from the plug member 38, as is shown. The valve stem 38 extends through the valve housing 20 and is acted upon by the electrical actuator 10. The valve stem 38 transmits the selective positioning force from the electrical actuator 10 to the plug member 36. The plug member 36 is situated in cage 42 along the flow passage 32 to provide a restriction orifice that regulates flow through the valve. The plug member 36 is linearly translatable toward and away from a valve seat 40 between fully closed and fully open positions, and intermediate positions therebetween. The plug member 36 blocks all flow when in the fully closed position and allows for maximum flow when in the fully open position.

To provide for installation of the movable valve member 20, the valve housing 38 may be composed of multiple pieces including the valve body 41, a metering cage 42 which radially restrains and guides movement of the valve plug member 36 and a bonnet 44 which radially restrains and provides for a seal arrangement 46. The seal arrangement 46 provides a static seal and dynamic seal that prevents leakage of natural gas from the valve 12. One suitable seal arrangement for preventing natural gas leakage in the valve is illustrated in U.S. Pat. No. 6,161,835 to Don Arbuckle, the entire disclosure of which is incorporated by reference.

Figure 9:
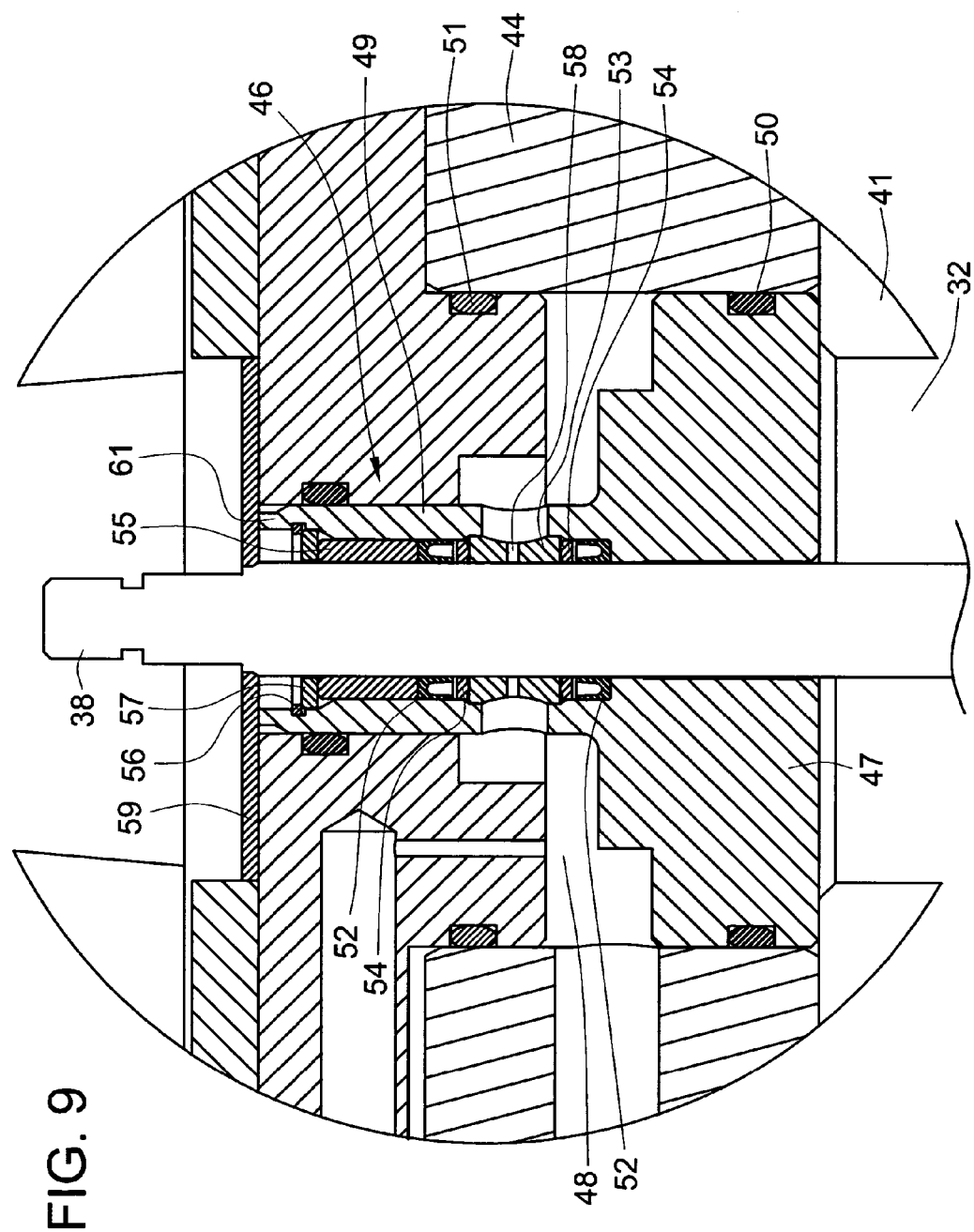
FIG. 9 is an enlarged cross section of FIG. 8 illustrating a sealing arrangement for the valve.
Figure 10:
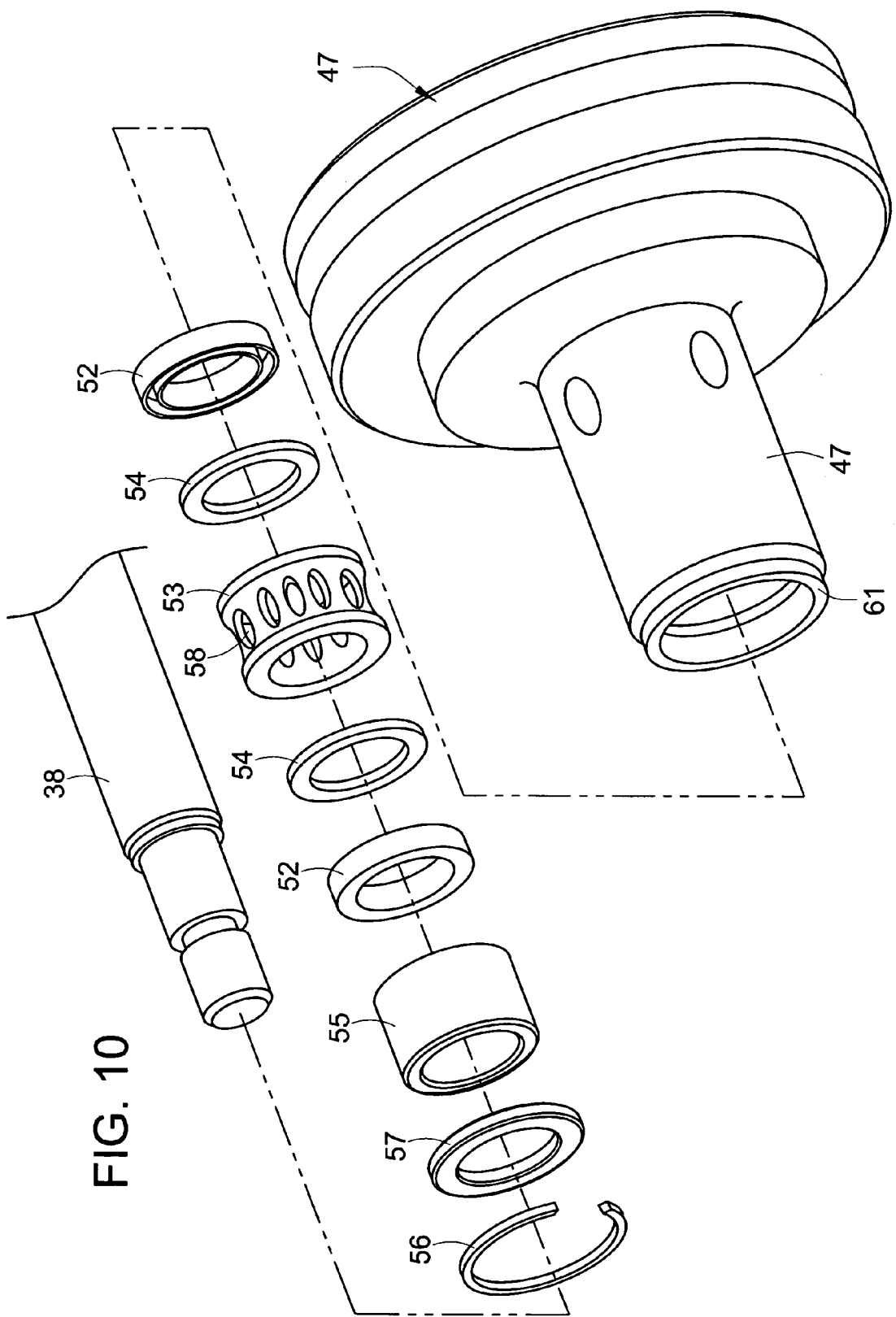
FIG. 10 is an exploded assembly view of the sealing arrangement shown in FIG. 9.
Figure 11:
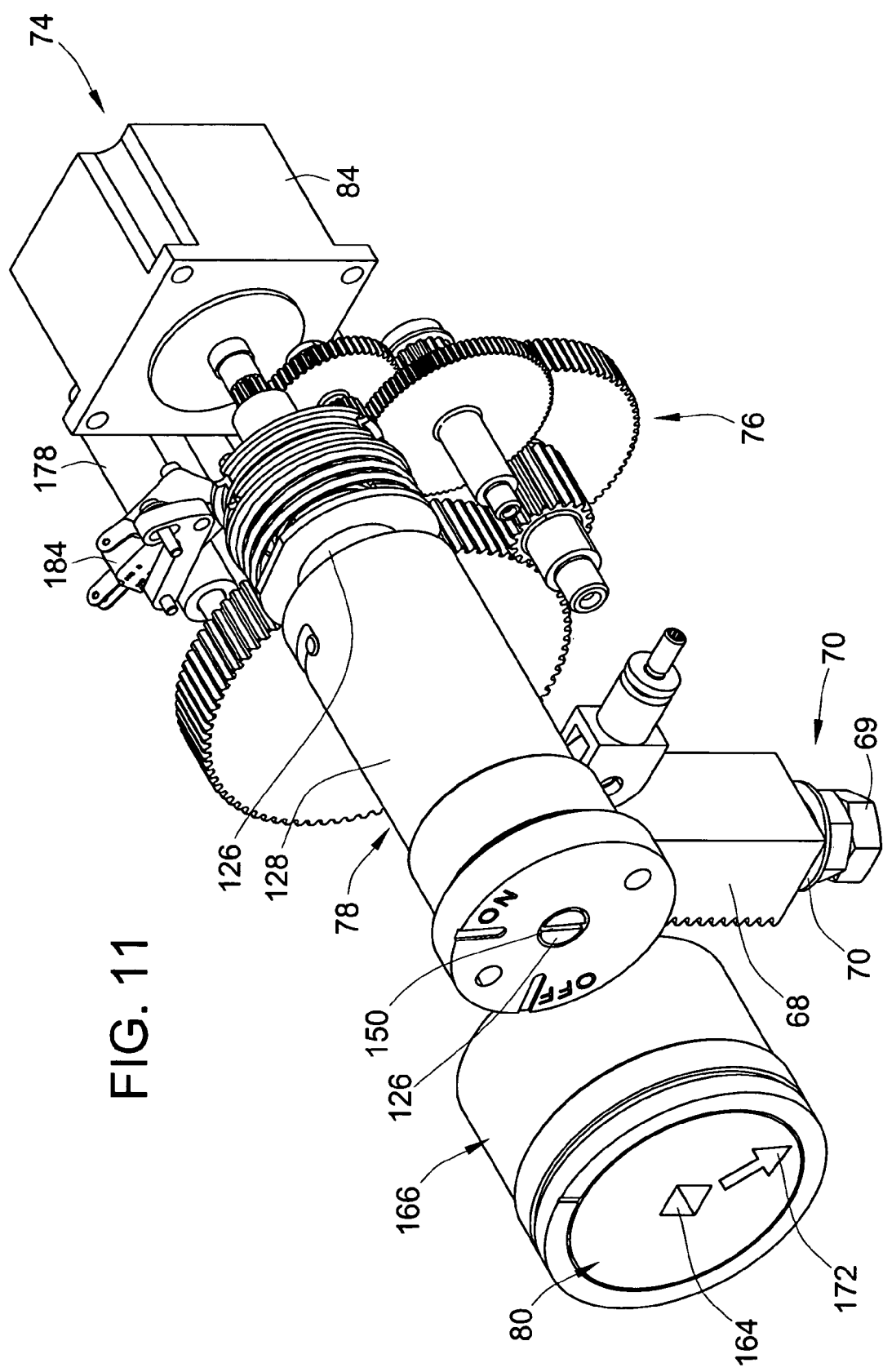
FIG. 11 is an isometric view of the guts of the electrical actuator shown in previous figures.
Figure 12:
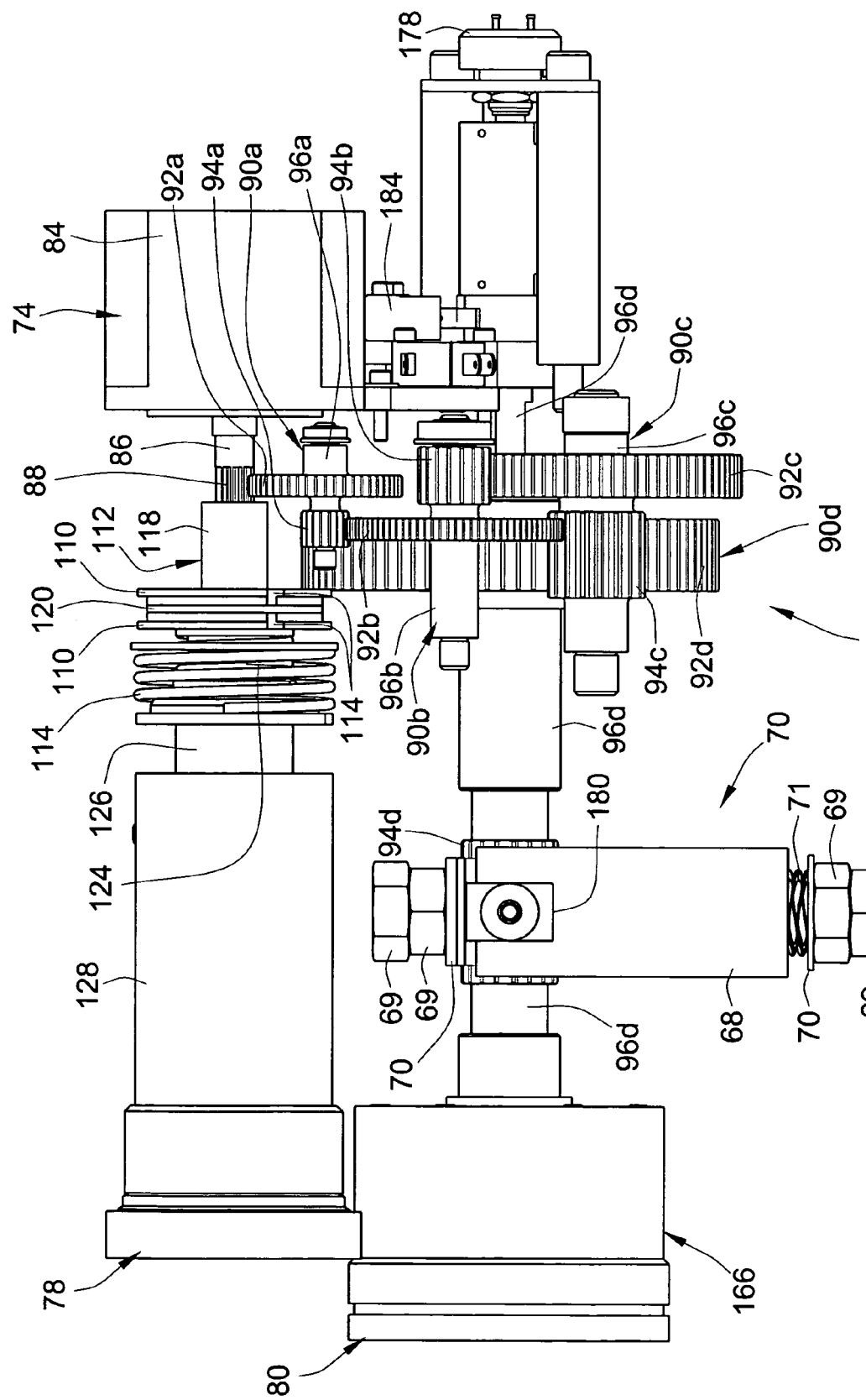
FIG. 12 is a side view of the guts of the electrical actuator shown in previous figures.
Figure 13:
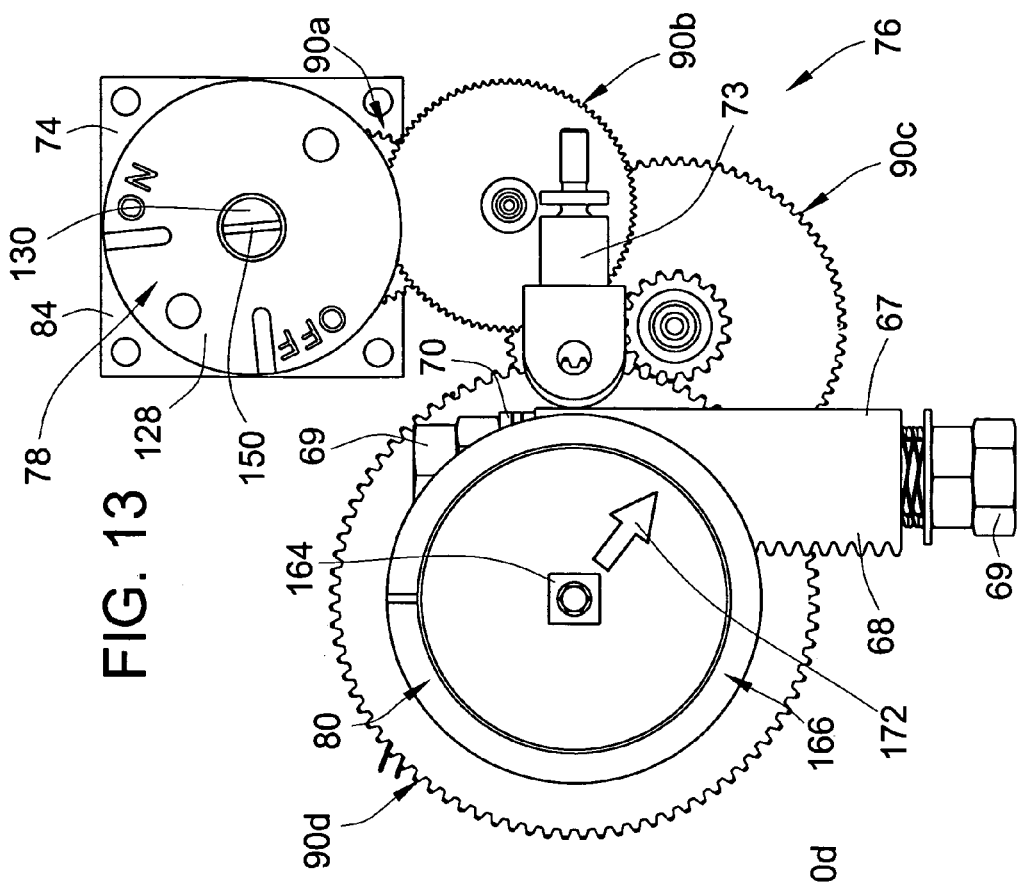
FIGS. 13–14 are frontal and back views of the guts of the electrical actuator shown in previous figures.
Figure 14:
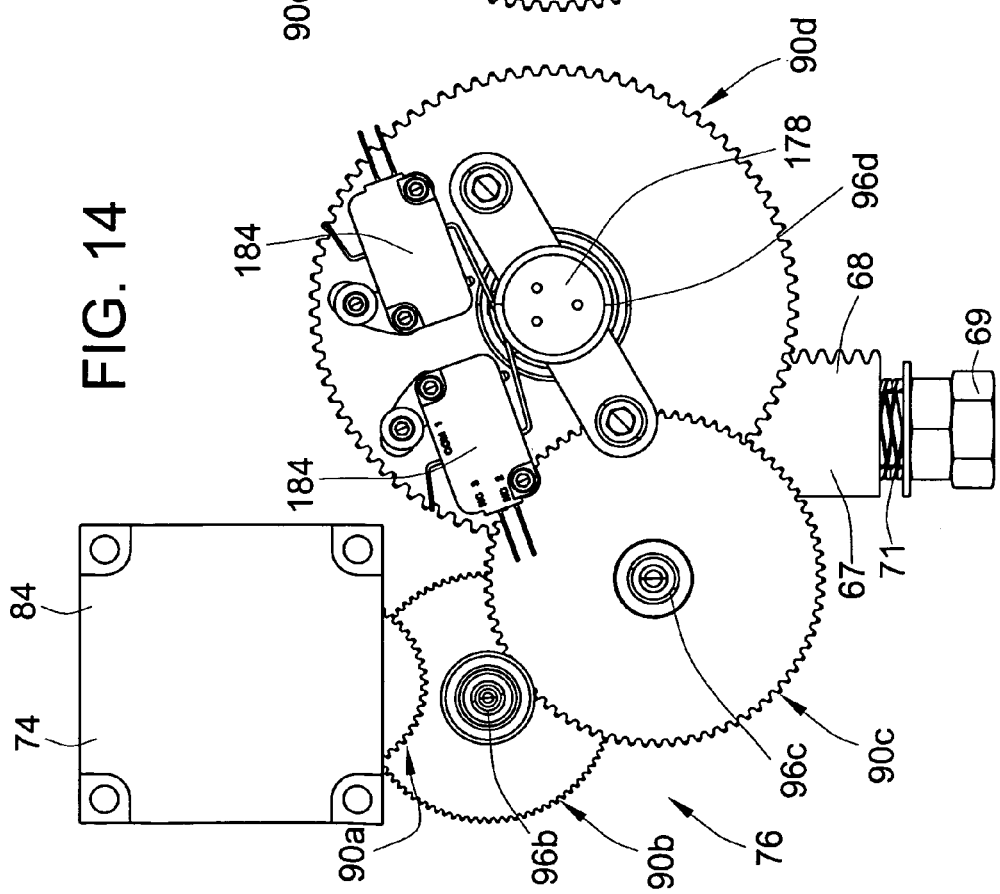
Figure 17:
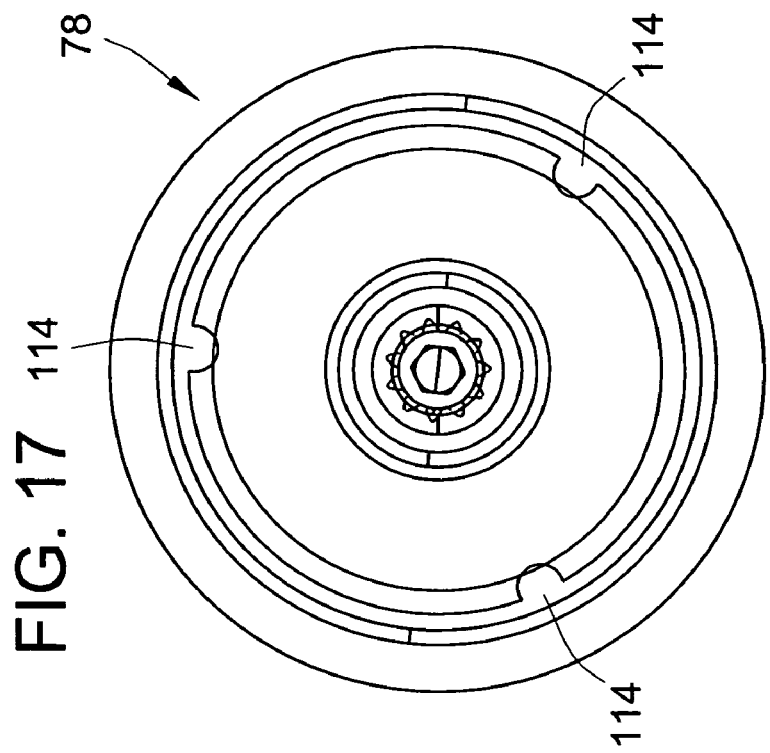
FIGS. 15 and 17 are front and rear end views of the brake mechanism used in the electrical actuator shown in previous figures.

However, the disclosed embodiment includes a more advantageous and novel seal arrangement 46 that is less complicated, less expensive and more reliable. Referring to FIGS. 9–10, the sealing arrangement 46 includes a pressuring annular piston 47 extending through and surrounding the valve stem 38. One face of the piston 47 is acted upon by process fluid contained in the valve flow passage 32 to pressurize seal lubricant fluid that is contained in a sealant cavity 48. The piston 47 includes a sleeve portion 49 that contains a seal packing. The outer periphery of the piston 47 carries an o-ring seal 50 for preventing communication between process fluid and lubricant. Not much, if any, piston movement is anticipated where the o-ring seal 50 is located, and therefore this may be considered a static seal for all practical purposes. Another static o-ring seal 51 is located between the valve body 41 and the bonnet 44 for preventing leakage from the sealant cavity 48. Thus, the two O-ring seals 50, 51 are arranged in series and provide redundant backup to ensure process fluid does not leak through the sealant cavity.

The seal packing contained in the piston sleeve portion 49 includes a pair of dynamic pressure and spring urged cup seals 52 arranged in fluidic series, a spacer element 53, a pair of seal retainer washers 54, a PTFE guide bushing 55, a snap ring 56 and a retaining washer 57. The snap ring 56 snaps into a groove in the piston sleeve portion 49 to axially retain the seal packing in place. The PTFE guide bushing 55 is tightly fit around the valve stem 38 to provide for low friction sliding movement of the valve member 30. The spacer element 53 axially spaces the cup seals 52 with the seal retainer washers 54 providing for balance and retention of the seals 52. Ports 58 extend through the spacer element 53 such that a pressurized cylindrical ring of lubricant surrounds the valve stem 38 between the seals 52 such that the lubricant acts upon each of the dynamic seals 52.

A cover 59 is provided that encloses the packing and piston to prevent dust and other external contaminants from damaging the sealing arrangement 46. The cover 59 can be removed to manually check the level of lubricant which is indicative of how well the seals 50, 51, 52 are working. Specifically, the end of the piston sleeve portion acts as an sealant level indicator 61. When the sleeve end or indicator 61 is flush or coplanar with the top surface of the bonnet 44, the proper amount of sealant lubricant is contained in the sealant cavity 48. If the indicator is raised above the top surface by virtue of axial piston movement, that is indicative that sealant has leaked out. A partitioned scale may be provided along the outer surface of the piston sleeve portion 49 to provide a numerical indication of lubricant level if desired. Several advantages are provided with this seal arrangement 46, including easier manufacture and assembly, prevention of contaminants from reaching the sealing arrangement and an integral mechanism to indicate the seal lubricant level.

Figure 3:
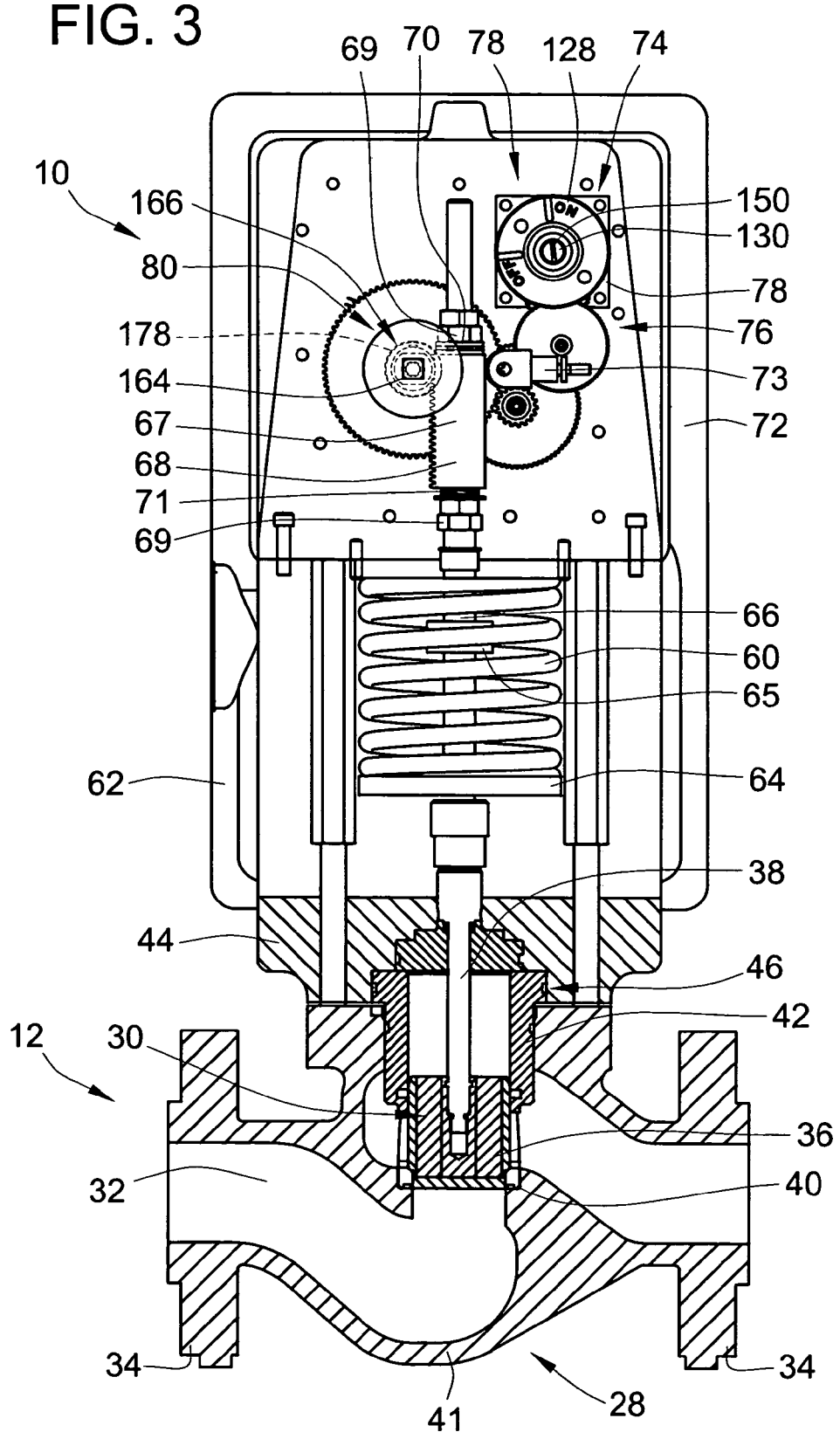
FIGS. 3–4 are cross sections of the electrically actuated valve shown in FIG. 2 with the cross sectional views being shown from the front and the side.
Figure 4:
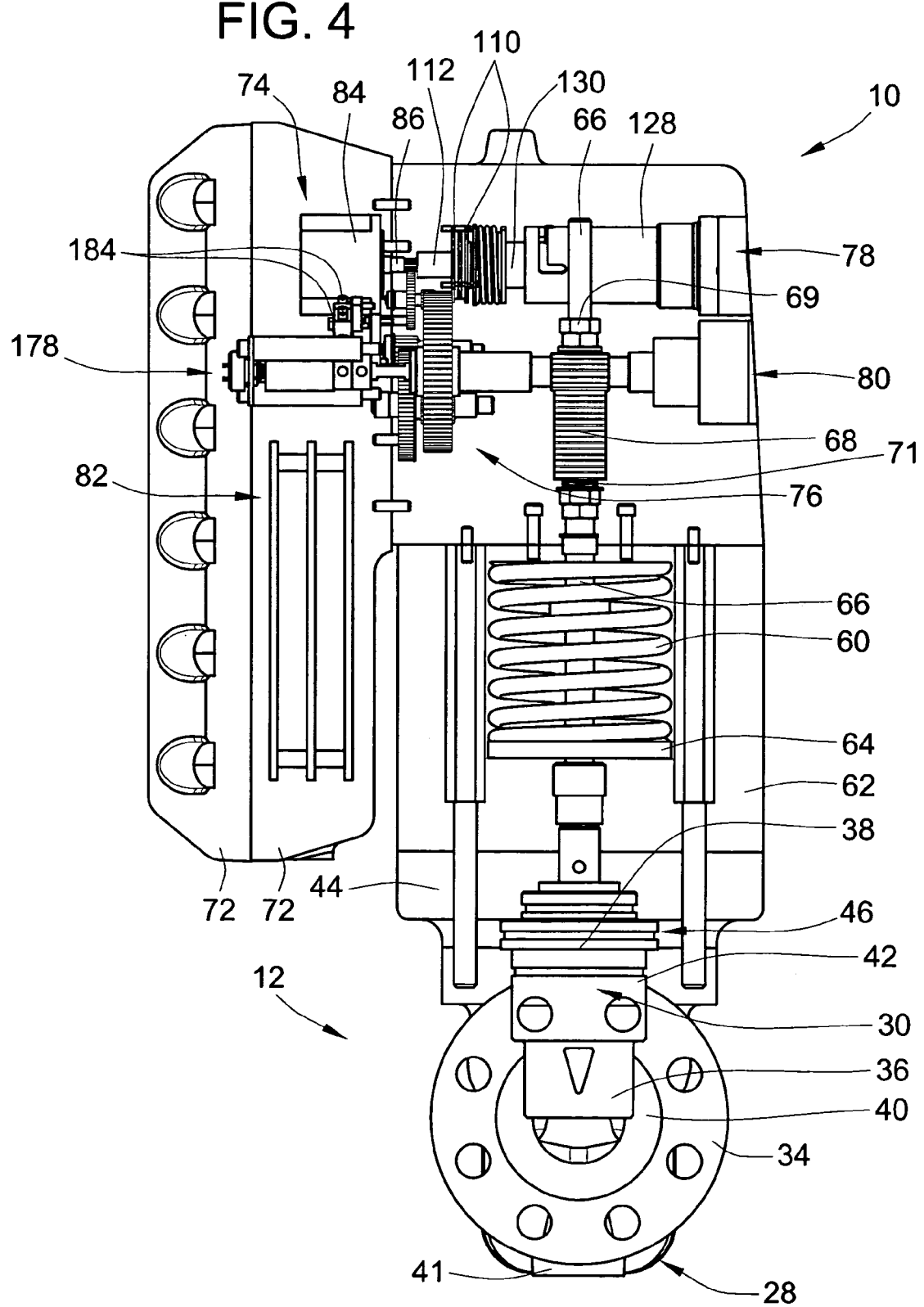
Figure 5:
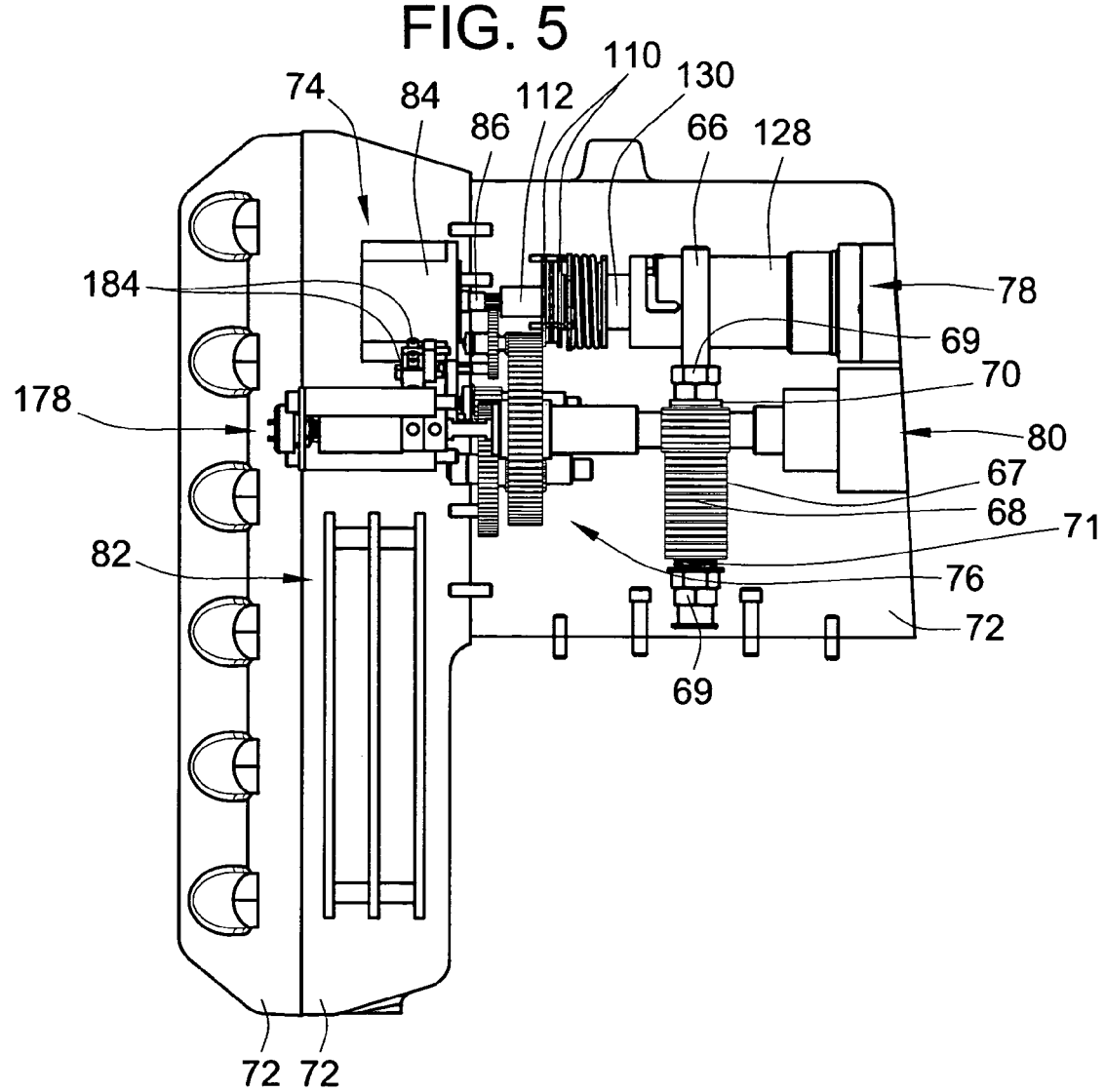
FIGS. 5 and 6 are cross sections of the electrical actuator portion of FIG. 3.
Figure 6:
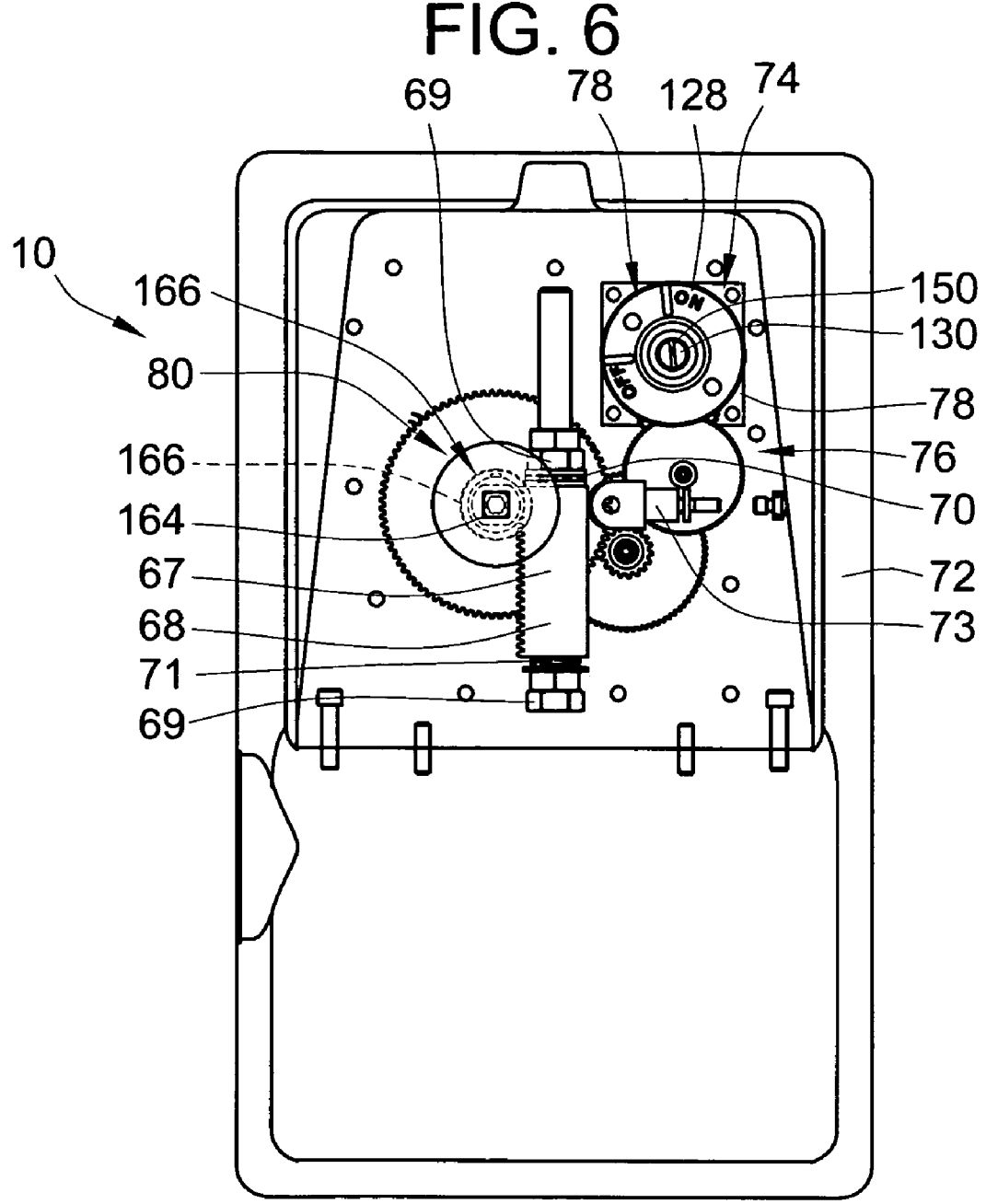
Figure 7:
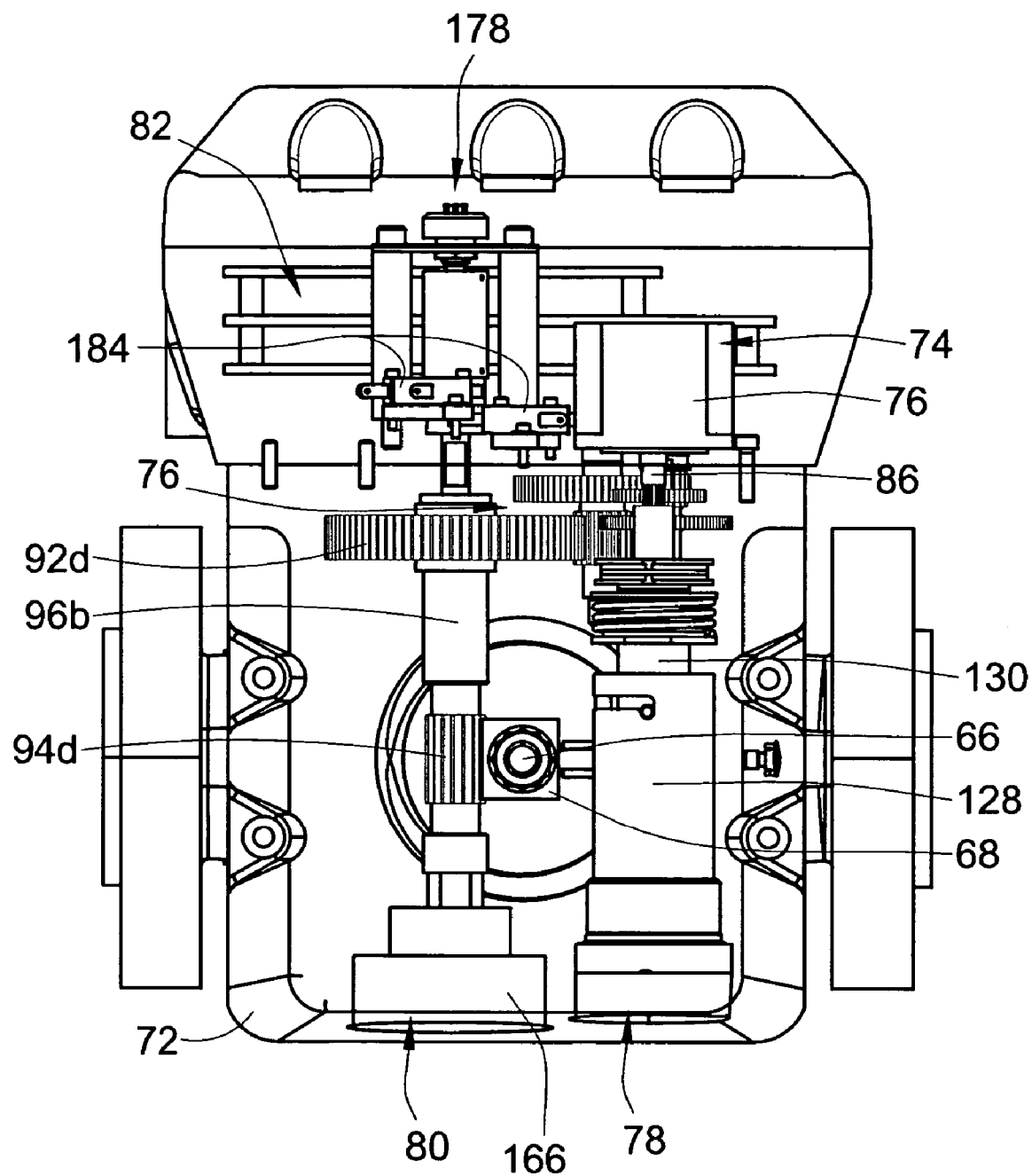
FIG. 7 is a cross section of the electrical actuator shown in the previous Figures as viewed from the top.
Figure 8:
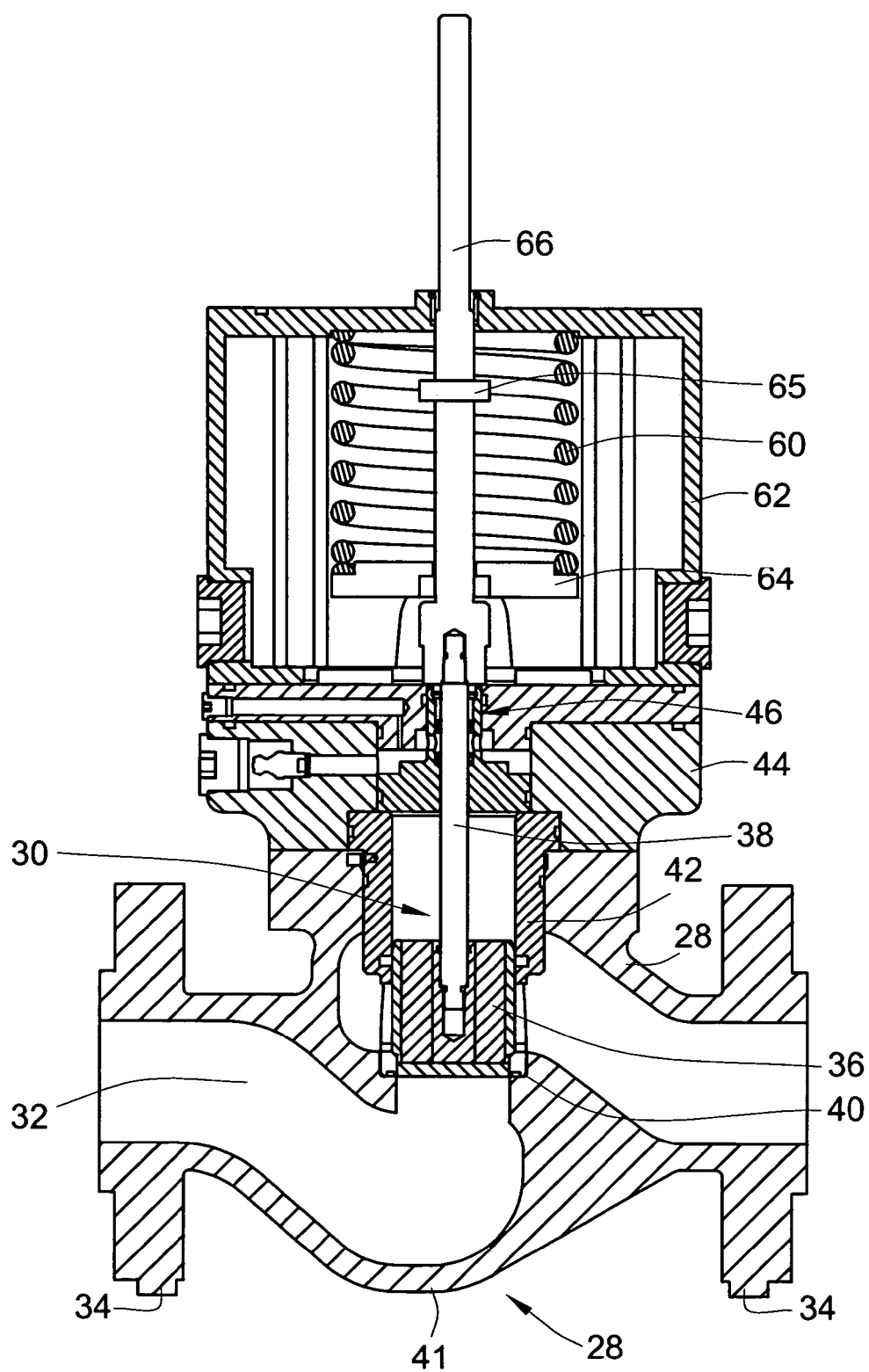
FIG. 8 is an enlarged cross section of the valve portion of the electrically actuated valve shown in FIG. 4.

The wellhead valve 12 may include a spring 60 for biasing the movable valve member 30 to either the open position or the closed position. As shown in FIGS. 3 and 8, the spring 60 is shown as a steel coil spring that is arranged to bias the valve member 30 to the closed position. A spring housing 62 mounts between the electrical actuator 10 and the valve body 41 to house and support the spring 60. The spring 60 is supported by one end of the spring housing 62 and upon a spring seat plate 64 that is supported by an actuator stem 66. One end of the actuator stem 66 engages the valve stem 38, while the other end has a drive rack 68.

Referring to FIGS. 3 and 11–13, the drive rack 68 provides a sleeve member 67 that is slid onto the actuator stem 66 such drive rack 68 can rotate relative to the actuator stem 66. A thrust bearing 70 better ensures free rotation of the drive rack 68 particularly since it is held axially in position by a wave spring 71. The sleeve member 67 is axially constrained between a pair of nuts 69 mounted on the actuator stem 66 and the wave spring 71 that biases the sleeve member 67 and drive rack 68 to a fixed position on the actuator stem 66. This arrangement allows for free rotation of the drive rack such that forces from the spring 60 do not cause the drive rack 68 to twist, thereby preventing premature wear, but it also holds the drive rack in a fixed axial position on the actuator stem. The wave spring 71 also compresses lightly when the valve member 30 contacts the seat, thereby reducing the resulting impact load on the gears. Another alternative to a rack and pinion mechanism for converting rotational energy to linear motion is a ball screw mechanism, and that and other conversion mechanisms may be used as an alternative.

It should be noted that the spring housing 62 and spring 60 are shown in FIG. 8 to be part of the wellhead valve 12. However, the spring housing 62 and spring 60 may alternatively be considered to be part of the electrical actuator and/or can be integrated into components of the electrical actuator or the valve. In either event, the spring 60 applies a biasing force to the electrically actuated valve which effectively acts both upon the valve plug member 36 and the gear reduction train 76, either directly or indirectly.

Figure 20:
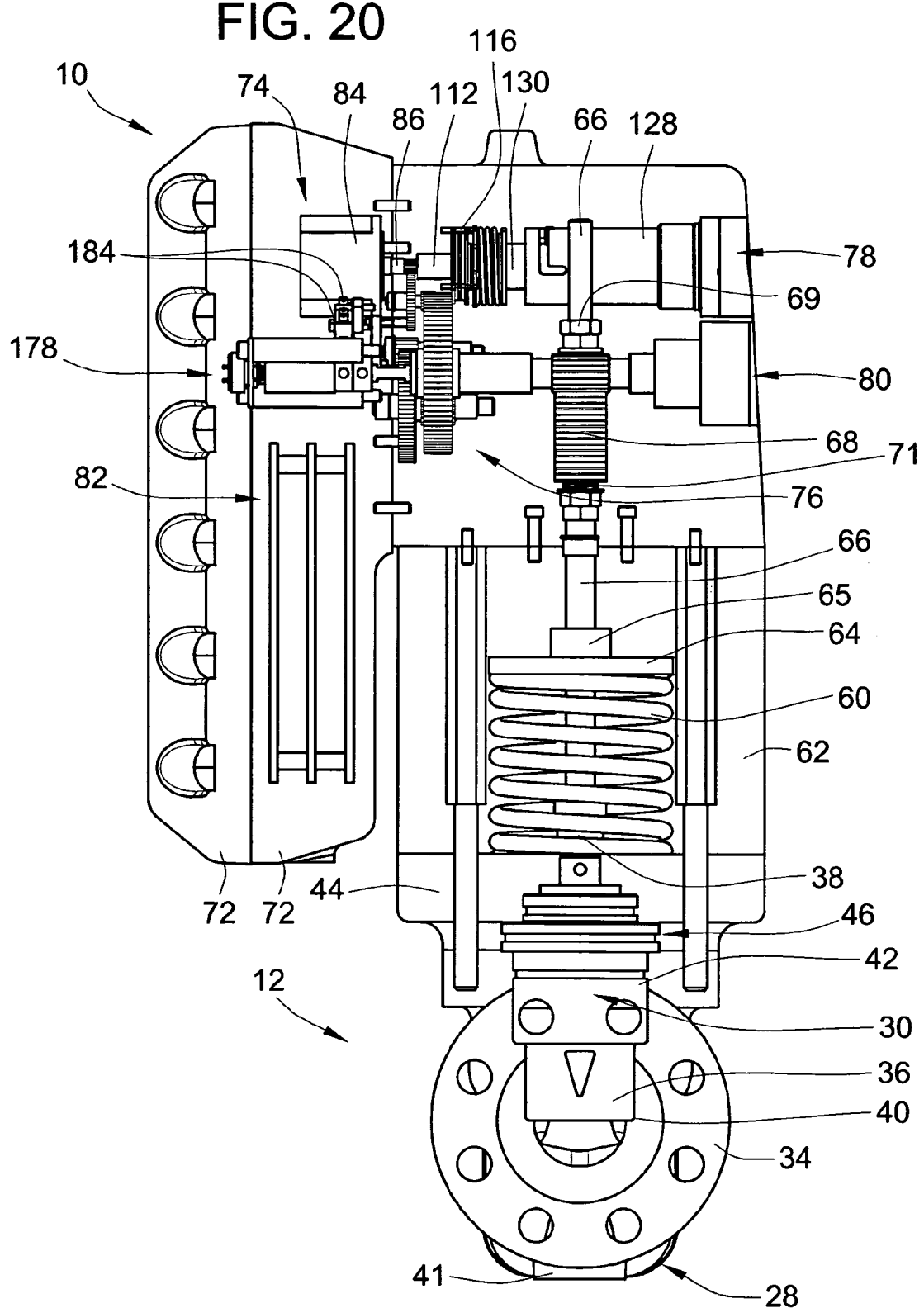
FIG. 20 is the same view as FIG. 3, except that the spring is reversed to bias the valve toward an open position.

The disclosed embodiment also provides a support structure 65 on the actuator stem 66 that provides a feature for reversing the actuation force of the spring 60 is also reversible. As shown in FIG. 20, the spring 60 may engage the other end of the spring housing 62 with the spring seating plate 64 supported by the alternative support structure 65, such that the spring as compressed between the spring seating plate 64 and the spring housing 62 biases the valve toward the open position. Thus, the spring is reversible such that the electrically actuated wellhead valve can be configured to bias the well-head valve either open or closed.

Referring to FIGS. 2–7, the electrical actuator 10 comprises an actuator housing 72 (comprised of several aluminum shells fastened together preferably in a leak proof manner) that generally contains and supports a stepper motor 74, a gear reduction train 76, a brake mechanism 78, a manual override mechanism 80 and a motor driver generically indicated as a motor controller 82. The actuator housing 72 mounts onto the spring housing 62. The stepper motor 74 is a non-incendive type motor that prevents spark formation when the electrical actuator is used around natural gas or other flammable fluids and thereby further reduces the potential for a hazardous situation should there be gas leakage. Other potential appropriate spark free types of motors include a brushless DC motor, and a spark-free AC motor.

In an embodiment of the present invention pertaining to wellhead valve applications, the controller 82 selectively energizes the motor 74. The electrical motor 74 can be operated by the controller 82 in a hold mode for holding the current position of the wellhead valve 12 and an actuation mode for driving the wellhead valve 12. The electrical motor consumes between 1 and 3 watts in the hold mode (to provide a force that holds a current valve position with the brake off) and between 4 and 12 watts in the actuation mode. This very low power consumption makes the electrical actuator 10 capable of operating solely off an existing electrical power supply provided by a solar panel 24 and battery 26 (which local power source may have been originally intended for regulating electro-pneumatic wellhead valves).

Referring to FIGS. 11–14, the stepper motor 74 includes a motor housing or stator 84 mounted in fixed relation relative to the actuator housing 72 and a rotor comprising an output shaft 86. The output shaft 86 rotates relative to the stator 84. The output shaft 86 integrally provides a pinion gear 88 thereon (either by machining the output shaft or mounting a separate gear cog mounted thereto) which provides an input for the gear reduction train 76. The gear reduction train 76 comprises a plurality of individual reduction gears 90*a–d* that each comprise a larger upstream gear cog 92*a–d* and smaller downstream gear cog 94*a–d* (i.e. a "pinion" gear) that are mounted on a common gear shaft 96*a–d*.

The gear shafts 96*a–d* are rotatably mounted or supported for rotation by the actuator housing 72 in parallel relationship. The pinion gear 88 on the output shaft 86 is meshed with the larger cog 92*a* of the first reduction gear 90 such that the force is amplified from the motor output shaft 86 to the first gear shaft 96*a*. The other gears in the gear reduction train are similarly arranged with the smaller gear cogs 94*a*–94*c* driving the larger gear cogs 92*b*–92*d*, respectively. As the motor rotates, the electrical actuation force provided by the motor 74 is applied and amplified across the gear reduction train 76 from the motor output shaft 86 to the rotary output, which is then applied by the last smaller pinion gear cog 94*d*. The smaller gear cog 94*d* is meshed with the drive rack 68 to drive the drive rack 68 and thereby convert rotational energy into linear translation energy. A spring biased cam element 73 supported by the actuator housing 72 keeps the racked biased against the pinion gear cog 94*d* in meshed relation (this may be used as a torque limiting device to prevent damage in the event of error or an overtorquing situation). Another alternative to a rack and pinion mechanism for converting rotational energy to linear motion is a ball screw mechanism, and that and other conversion mechanisms may be used as an alternative.

In order to be sufficient for driving the wellhead valve 12 in wellhead valve systems 14, the gear train preferably has a gear reduction ratio of at least 100:1 and more preferably of at least 400:1. With such a substantial gear reduction ratio, a small motor force (e.g. consuming 4–12 watts for driving the valve with current motor technology that is readily available) is amplified by the gear reduction train to provide sufficient actuation force for driving and positioning the valve 12 against spring forces and/or fluid forces, which can be very substantial in view of the fact that well pressures can vary in a range of about 10–900 psi. Obviously, the speed of the actuation will be decreased substantially with the slew time of the valve 12 between fully open and closed positions taking about 1–5 minutes. It has been realized that a slow slew time is acceptable and does not appreciable affect well production control (particularly since production often occurs 24 hours a day with demanded changes in well output occurring on a relatively infrequent basis). This is also particularly true when considering the significant advantages associated with reducing and in fact eliminating for all practical purposes all fugitive gas emissions using the local power source typically provided at wellhead valve sites.

Referring to FIGS. 15–19, the brake mechanism 78 acts at least partially through the gear reduction train 76 and as shown in the disclosed embodiment, directly on the output shaft 86 of the motor 74. The brake mechanism 78 may act on the motor pinion 88 to retard the forces of the return spring and/or fluid pressure forces transmitted through the gear train such that only a fraction of the force is transmitted to the motor shaft 86 of the motor 74. Thus the brake mechanism 78 may be used to greatly reduce the amount of holding force needed by the motor to hold a current position of the valve, or to completely eliminate a holding force to maintain a current valve position.

The brake mechanism 78 includes a pair of brake calipers 110 and a rotor 112. The calipers 110 include slots 114 on their outer peripheries that receive stationary support pins 116 which are supported and mounted into, by and extend from the actuator housing 72. The pins 116 hold the calipers 110 stationary and prevent rotation of the calipers 110. The outer caliper 110 is also axially abutted up against and supported by the actuator housing 72. The rotor 112 includes a sleeve portion 118 that is splined to the output shaft 86, and a plate portion 120 sandwiched axially between the brake calipers 110. The calipers 110 include radially inward projecting circular ribs 122 that frictionally engage the rotor plate portion 120 when the brake is engaged in the on position. The ribs 122 are relatively thin radially to provide a substantially constant diameter ring that engages the rotor 112 to provide a more consistent braking force (e.g. thereby avoiding slippage at a smaller diameter that could occur with a radially wider brake pad caliper). A braking spring 124 applies an axial force to frictionally engage the calipers 110 against opposing sides of the rotor 112.

Figure 18A:
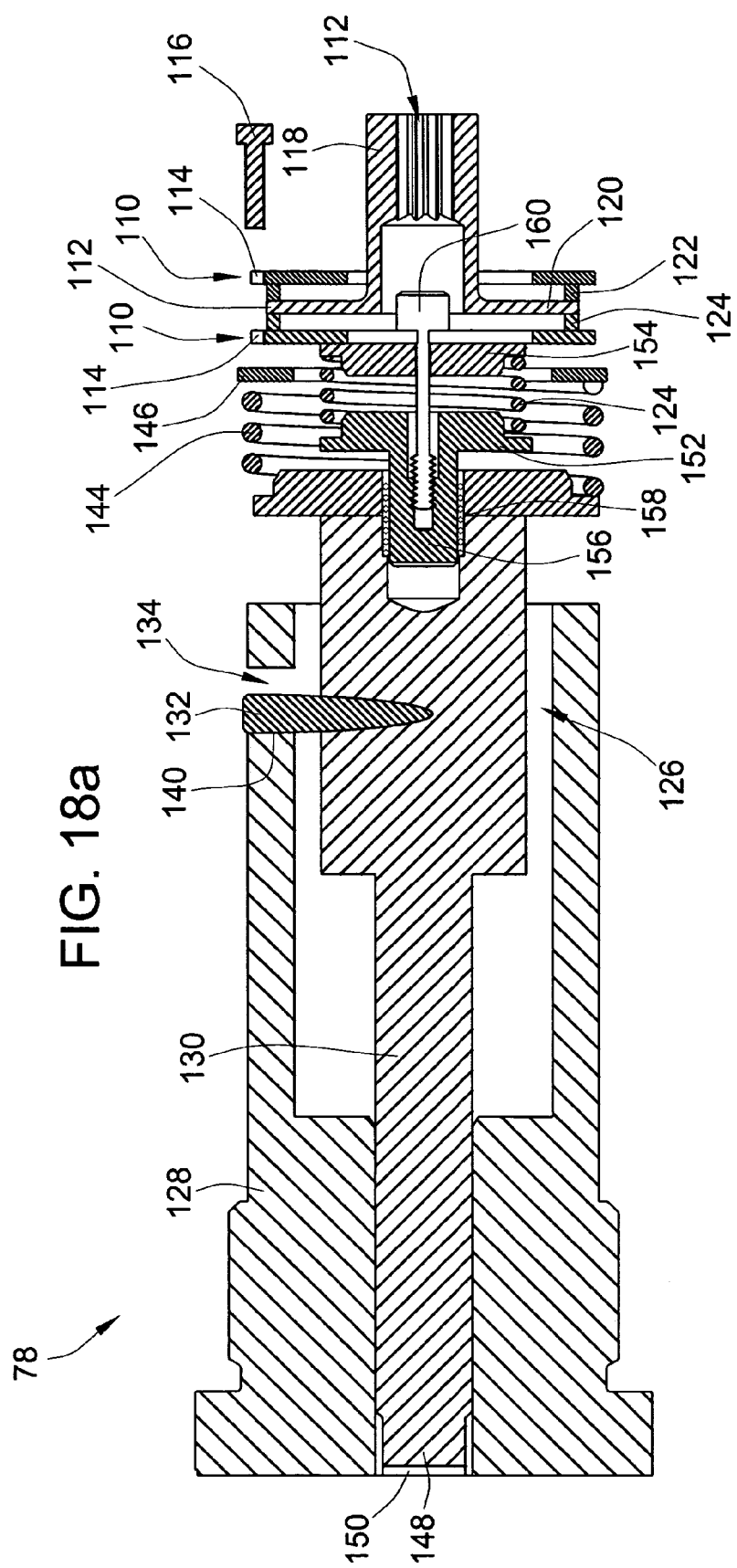
FIGS. 18a and 18b are cross sections of the brake mechanism shown in FIGS. 15–17, illustrated in the on and off positions, respectively.
Figure 18B:
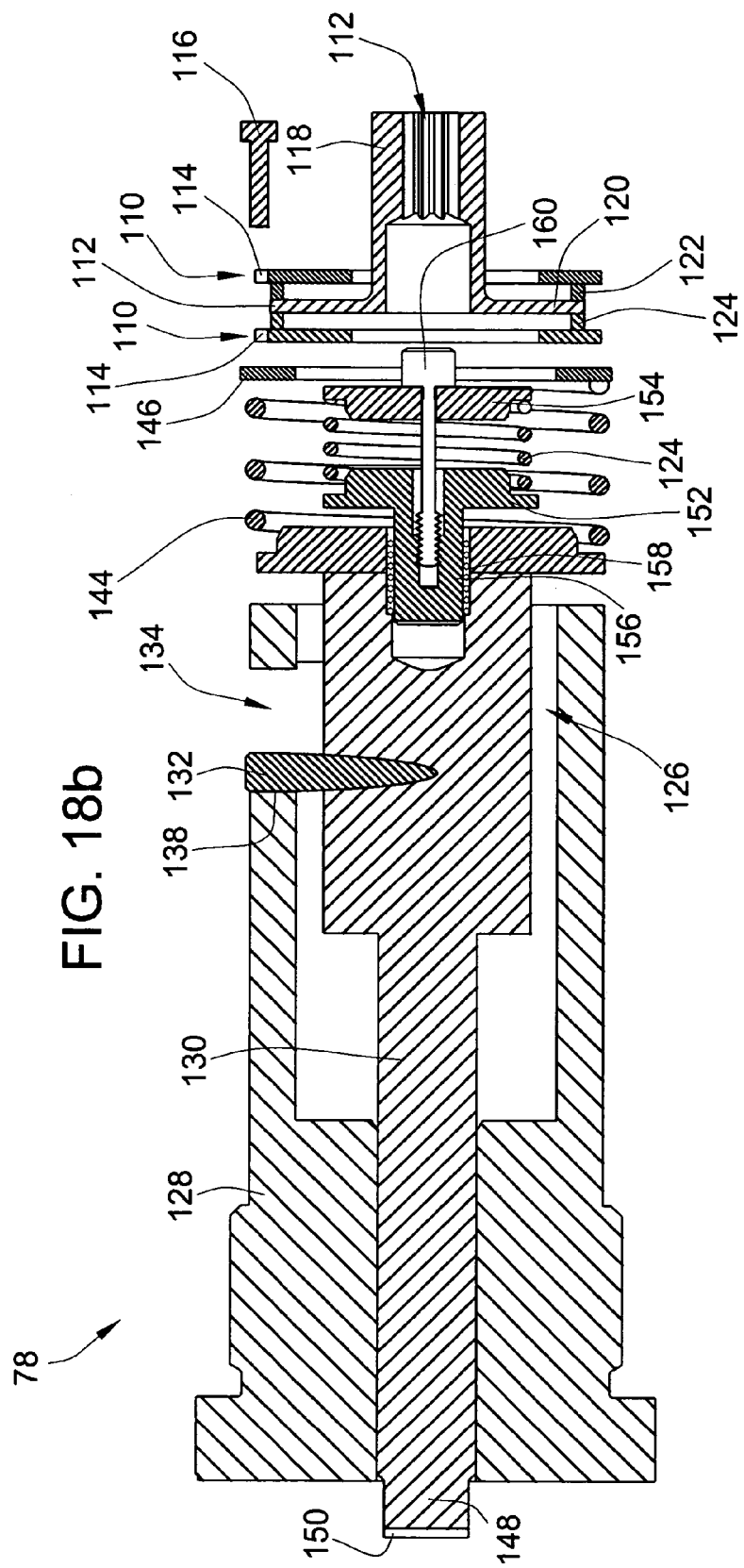
Figure 19:
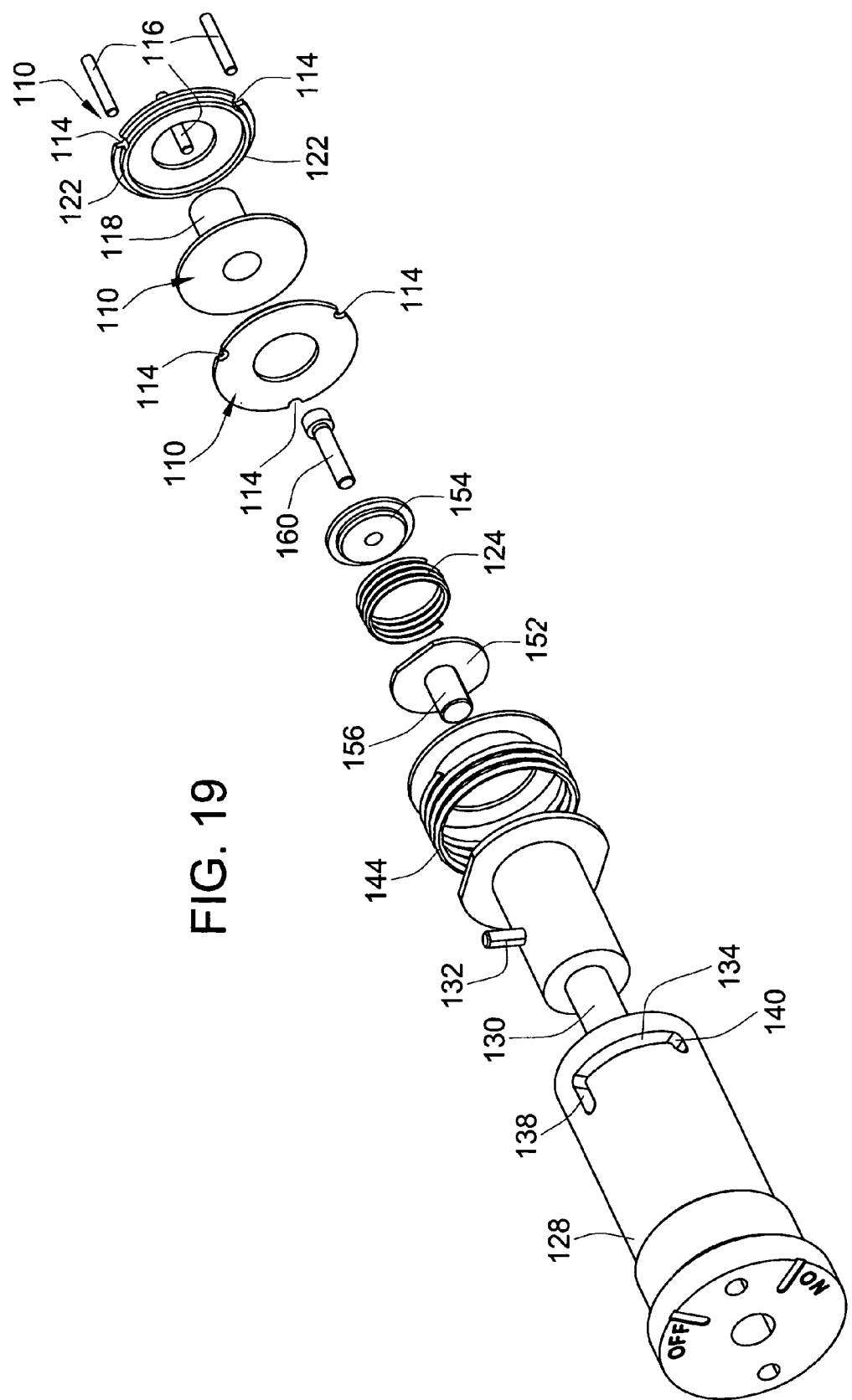
FIG. 19 is an exploded assembly view of the brake mechanism shown in FIGS. 15–18.

Although the brake mechanism 78 may be permanently positioned in the on position and therefore designed solely as a dynamic brake, preferably the brake mechanism also includes an actuator device 126 for manually engaging and disengaging the brake between on and off positions as shown in FIGS. 18*a* and 18*b*. The brake may have different levels of engagement as well to provide different levels of braking force. In the disclosed embodiment, the actuator device 126 includes a sleeve shaped support housing 128 that threads into or otherwise mounts into the actuator housing 72. The actuator device 126 also includes shank shaped selector switch member 130 that is slidably inserted into the support housing 128 for rotation and linear movement relative to the support housing 128.

The linear and rotational movement of the switch member 130 relative to the support housing 128 is constrained with a pin 132 and slot 134 mechanism. The pin 132 is securely mounted to switch member 130 and extends radially outward therefrom into the slot 134, which is defined by the support housing 128. The slot 134 includes first and second axially extending legs 138, 140 that correspond to the on and off positions, respectively, and a radially extending intermediate section 142 separating the legs 138, 140. The first leg 138 is longer than the second leg 140 to provide for on and off positions. An outer spring 144 is supported by a washer 146 that is held stationary in a fixed position by the actuator housing 72. The outer spring 144 axially biases the switch member 130 toward the support housing 128 such that the pin 132 is restrained and urged toward the terminating end of leg when the pin 132 is positioned in either of the legs 138, 140.

Figure 15:
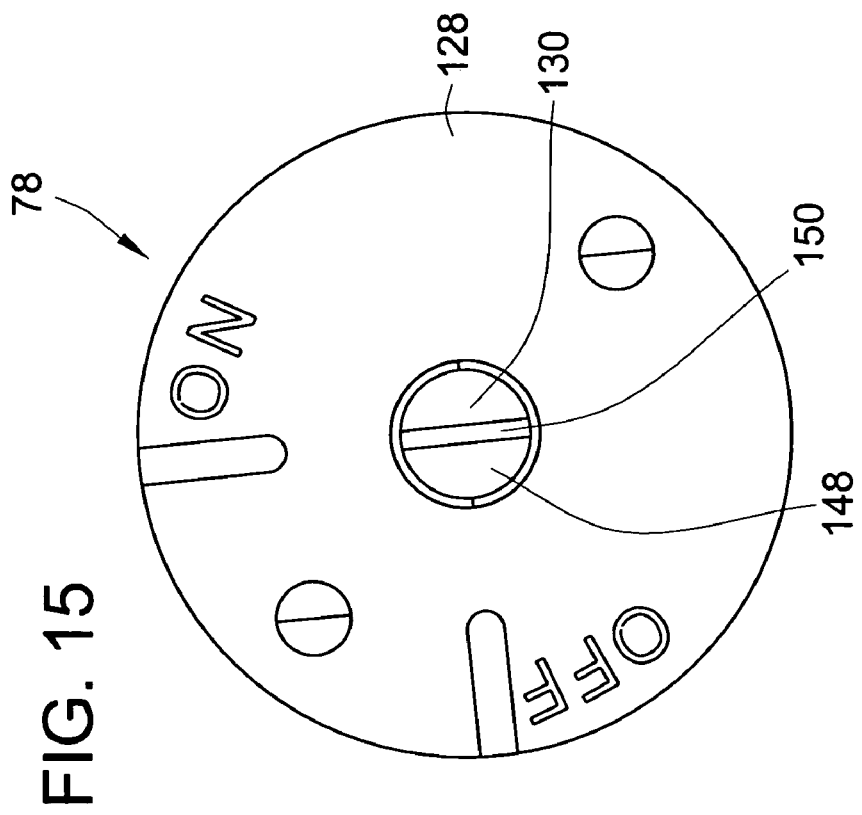

The switch member 130 includes an actuating stem portion 148 that extends through a central hole in the support housing 128. The stem portion 148 includes a manually crankable head portion exposed on the outside of the actuator housing 72. The crankable head portion is shown as including a screwdriver slot 150 or other structure that is adapted to be rotated by a tool or crank mechanism. As shown in FIGS. 18a, 18b, the switch member 130 can be manually pushed inward against the action of the outer return spring 144 and manually rotated between on and off positions (as indicated on the outside of the support housing as shown in FIG. 15).

The selector switch member 130 carries the brake spring 124 that is adapted to apply the axial braking force to the brake calipers 110. The brake spring 124 is supported at one end by a spring seat 152 and axially urges a brake applicator plate 154 away from the selector switch member 130. The spring seat 152 includes a threaded stem 156 that threads and locks into a threaded opening 158 in the selector switch member 130, via a self-locking thread such that the position of the spring seat 152 is fixed relative to the selector switch member 130. How far the spring set 152 is screwed into the selector switch member 130 generally determines and is used during assembly to gauge and set the braking force that is applied in the on position for the brake mechanism 78. The brake applicator plate 154 is axially movable relative to the spring seat 152. A shoulder bolt 160 extends through the brake applicator plate 154 and is mounted into the spring seat 152. The shoulder bolt 160 supports and guides axial sliding movement of the applicator plate 154.

When the brake mechanism 78 is in the on position as shown in FIG. 18a, the braking spring 124 urges the applicator plate 154 against the inner brake caliper 110 such that the spring compresses the brake calipers 110 against the rotor 112. When the brake mechanism 78 is in the off position as shown in FIG. 18b, the braking spring 124 urges the applicator plate 154 against the head of the shoulder bolt 160 which acts as a stop to prevent the spring from acting upon the calipers 110.

Also provided in the electrical actuator 10 is the manual override mechanism 80 which includes a crankable input shaft 162 that includes a head with a rectangular structure 164 that can be engaged and rotated by a manual crank or tool. The input shaft 162 is journalled in the actuator housing 72. The input shaft 162 acts through a torque limiting clutch 166 (or other torque limiting device, e.g. a shear pin) upon one of the gear shafts 90d such that rotation of the input shaft 162 is operable to linearly the valve member 30 manually. The torque limiting clutch 166 prevents manual overtorquing of the apparatus and thereby prevents damage to the drive rack 68 and the drive pinion 94d that could otherwise occur with manual overtorquing. The torque limiting clutch 166 may include an input plate coupled to the input shaft 162 that frictionally engages an output plate coupled to the gear shaft 90d. At a predetermined force or torque, the plates of the clutch 166 slip relative to each other to prevent overdriving of the valve. The clutch 166 is set such that the predetermined torque at which slippage occurs is small enough to prevent damage to the wellhead valve 12 from manual overtorquing but large enough to be sufficient to overcome all braking and biasing forces acting on the valve such as those caused by the brake mechanism 78 and the vale biasing spring 60, whereby the manual override mechanism 80 is manually operable to drive the valve member 30 to a selected position between fully open and fully closed positions, even with the brake mechanism 78 engaged in the on position. The head of the input shaft 162 has a pointer 172 and the actuator housing 72 has a scale 174 that indicate the degree of opening of the valve 12. The pointer 172 and scale 174 are used to indicate the position of the valve visually and for maintenance personnel when adjusting the valve manually.

A significant feature of the disclosed embodiment is that the electrical actuator 10 is configurable between three different possible modes of operation. Configuration is accomplished by having a biasing force of the spring 60 that is manually reversible and a brake mechanism 78 that also has on and off positions such that the spring 60 can drive the gear reduction train 76 and valve member 30, or the brake mechanism 78 can be used to hold valve position, when there is electrical power loss. The electrical actuator 10 thus has three different configurable operational modes upon power loss to the electrical motor 74, including a fail-open mode wherein the spring is arranged to urge the gear reduction train 76 and valve member 30 toward the fully open position upon power loss 60 with the brake mechanism 78 in the off position, a fail-close mode wherein the spring 60 is arranged to urge the gear reduction train 76 and valve member 30 toward the fully closed position upon power loss with the brake mechanism 78 in the off position, and a fail-fix mode wherein the brake mechanism 78 is in the on position and holds the current position of the gear reduction train 76 and the valve member 30.

Multiple position sensing devices are employed in the disclosed embodiment. First, the motor controller 82 integrally incorporates an analog position sensor 176 that derives position of the rotary output from motor position control signals sent to the electrical stepper motor 74. The analog position sensor is a form of an accumulator or counter that adds numbers and subtracts numbers from a count as a stepper motor 74 is driven to electronically derive position of the valve 12. The changes in valve position are linearly proportional to the changes in the count of the analog position sensor 176. The disclosed embodiment also includes a redundant position sensor electrically wired and providing feedback to the motor controller 82, which is shown in the form of a potentiometer 178. The potentiometer 178 is positioned by a cam that is acted upon by an eccentric surface on an extended portion of the last gear shaft 96. The potentiometer 178 provides redundant feedback that is used to check the accuracy of the analog position sensor 176 which could have error should there be a loss of electrical power or slippage in the stepper motor 74. Finally, the disclosed embodiment may also include limit switches 184 that are mounted proximate the last gear shaft 96d at set points representing the end of travel for the wellhead valve 12 also defined as the fully open and fully closed positions. The extended output gear shaft 96d includes cam eccentrics which trigger the limit switches 184 at the set points. The limit switches 184 are electrically wired to a customer interface to provide indication of when the valve is at a set point. This provides independent feedback to check accuracy of operation. Alternatively, the limit switch signals can be used to shut off power to the motor 74 to ensure that the controller 82 does not signal the motor to drive the valve past either of the fully open or closed positions. The limit switches 184 are also adjustable and manually rotatable relative to the output shaft 96d such that if an end user wishes to define a different end of travel range, the end user can manually configure and define the end of travel range as he deems fit.

Referring to FIG. 1, the system 14 may also include a wireless transceiver 186 powered by the local power source that is in electrical communication with one or both of the controllers 22, 82. It should be noted that the first controller 22 is provided at a wellhead valve site typically external to the electrical actuator 10 to provide system level control. The motor controller 82 is more of a motor driver to facilitate control over the driving of the electrical actuator 10 and positioning of the wellhead valve 12. In any event, the wireless transceiver 186 can receive remote control input and demand signals wirelessly from a remotely positioned transceiver 188, such that either or both of the controllers 22, 82 can be remotely controlled to adjust position of he wellhead valve 12 wirelessly. The transceiver 186 can also transmit feedback to a remote location and thereby inform maintenance personnel about the operating parameters at the well head site (e.g. flow rate, valve position, power levels, malfunctions, etc.).

Another alternative aspect of an embodiment may be the incorporation of a sleep mode for the electrical actuator 10 in which it consumes virtually no electrical power and powers itself down automatically when the valve 12 is correctly positioned. According to this mode, the brake mechanism 78 is normally in the on position and therefore acting as dynamic brake arranged to provide resistance to movement of the valve 12. Since the brake mechanism 78 when on provides sufficient force to prevent backdriving of the gear train upon power loss, the brake mechanism 78 is operable to hold a current position for the wellhead valve 12. The electrical motor 74 provides sufficient force and torque to cause the brake to slip and thereby overpower the brake to move the wellhead valve 12 when desired. The sleep mode further provides for energy efficiency and lowers power consumption when electrical power in these remote locations is scarce.

Figure 21:
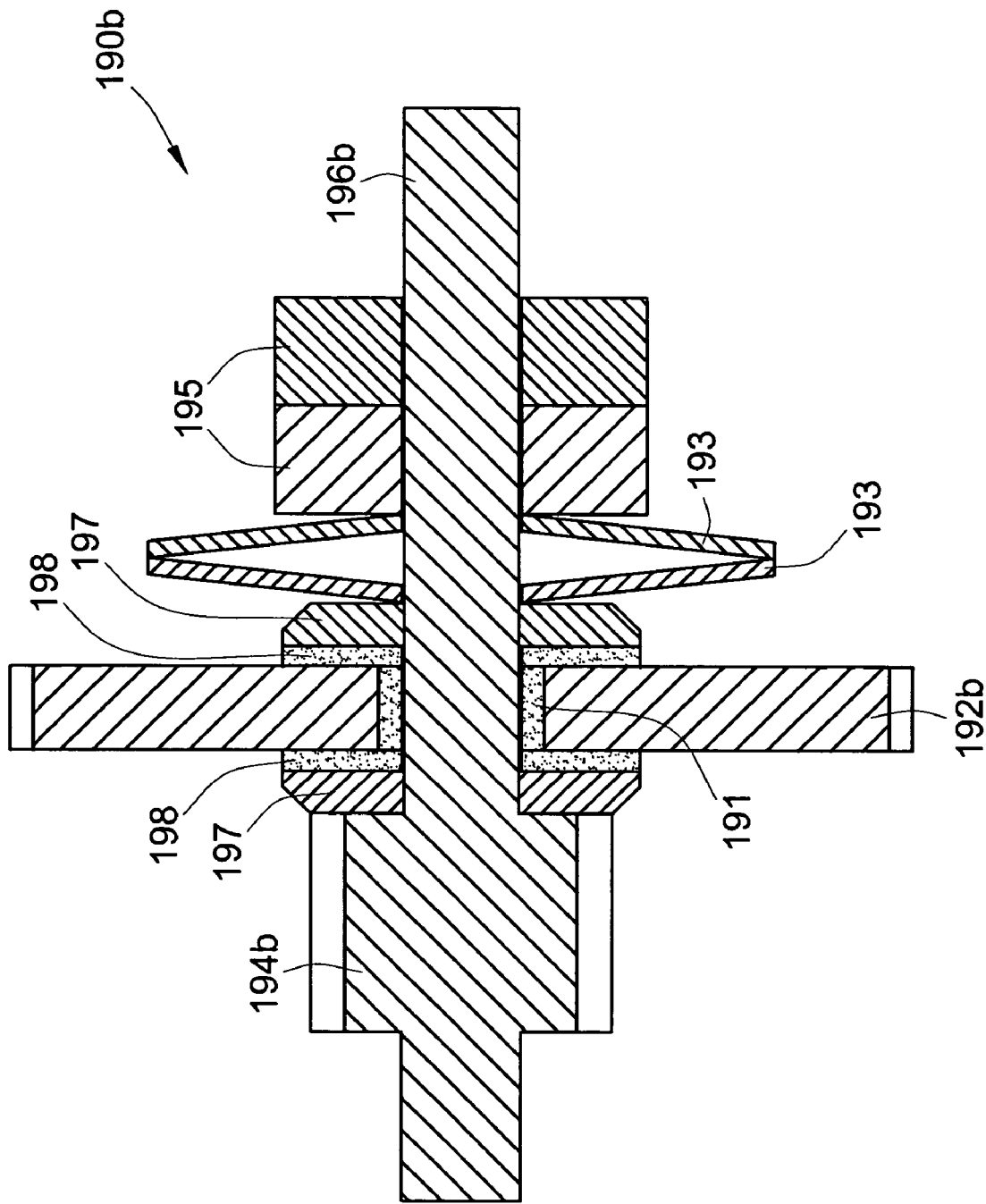
FIG. 21 is a cross section of a drop in clutch gear which may be used in the electrical actuator, being substituted for one of the gears.
Figure 22:
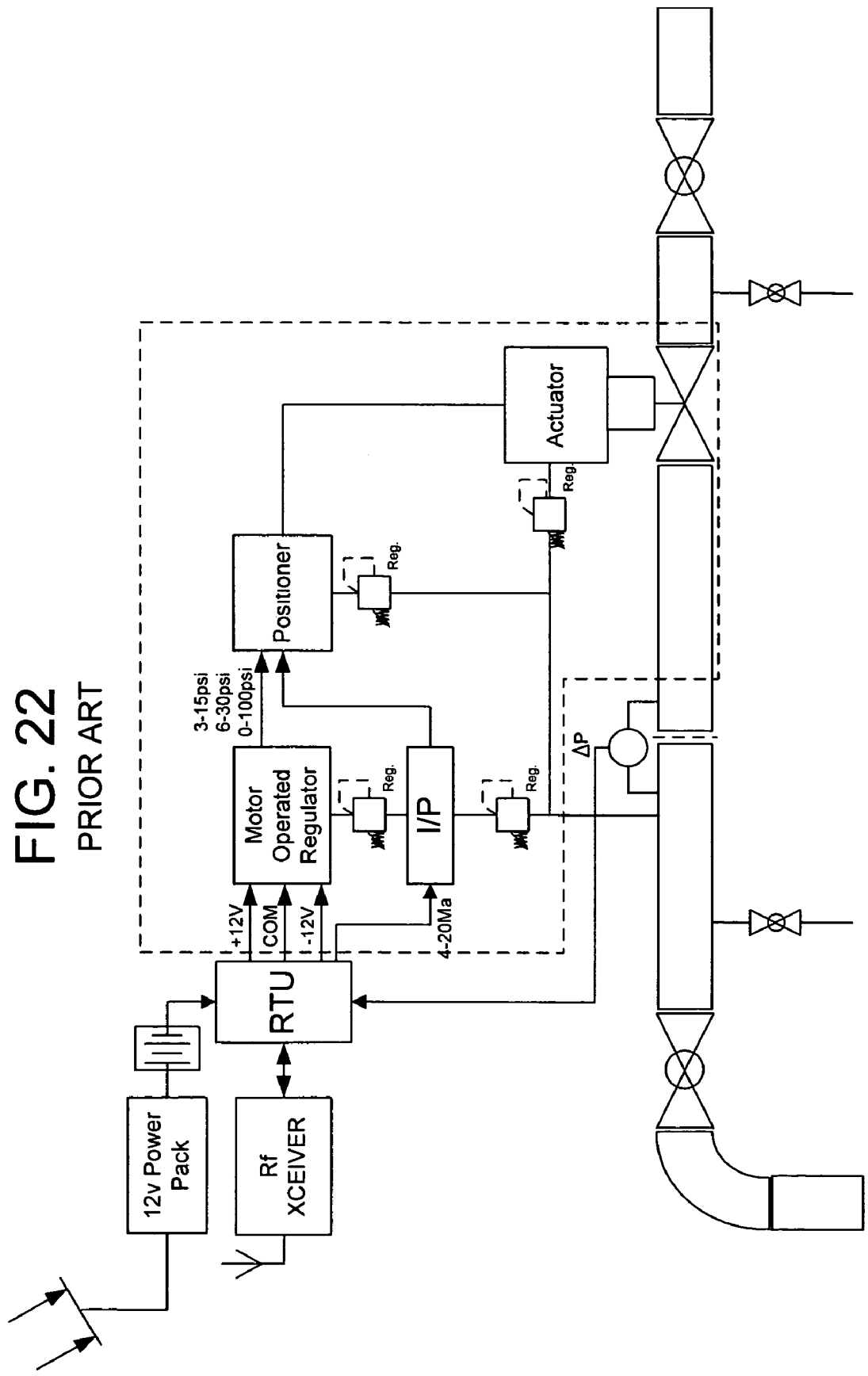
FIG. 22 is a schematic view of a commonly employed control system for a well head valve.

Another feature shown in FIG. 21 is an alternative drop in clutch reduction gear 190b that can replace reduction gear 90b. The clutch reduction gear 190b is particularly useful and can be used for the actuator when configured for fail-open mode, in which the spring 60 is arranged to bias the valve open as shown in FIG. 20. The clutch reduction gear 190b similarly includes a larger gear cog 192b and smaller pinion gear cog 194b on a gear shaft 196b. As shown, the larger gear cog 192b is slidably mounted with a sleeve bushing 191. A pair of spring washers 193, supported by axially fixed bearing support members 195 (which are supported by the actuator housing) urge a pair of support plates 197 and frictional engaging discs 198, with the larger gear cog 192b therebetween, together against the pinion gear 194b. The support plates 197 are splined or keyed to the shaft 196b such that the compression applied by the spring washers 193 is operable to lock the larger gear cog 192b to the shaft 196b below a predetermined torque and allow rotational slippage of the larger gear cog 192b above the predetermined torque. The advantage of the clutch mechanism incorporated into the reduction gear 190b is that slippage at a predetermined torque occurs. When using a stepper motor 74, slippage can occur within the stepper motor at high loads. By setting slippage in the clutch reduction gear at a lower load (accounting for gear amplification), this better ensures that slippage in the stepper motor 74 does not occur which could otherwise allow the spring to move the valve to an undesired position.

Finally, although the present invention is shown for use in controlling or regulating natural gas at a well head, the present invention may have other applications. For example, the actuator 10 may be used with a valve for regulating the flow of other types of process fluid, including other types of gases and liquids.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pressurized stem sealing arrangement for sealing an elongated stem having a first end in communication with a process fluid and an opposing second end arranged to be acted upon by an actuating force, the sealing arrangement comprising:
    a piston surrounding a portion of the stem between the first and second ends, the piston including a face acted upon by the process fluid and a sleeve portion extending axially along the stem; and
    a seal packing retained in the sleeve portion, the seal packing including a first and second seal elements axially spaced apart by a spacer element, the seals being subjected to pressure generated by the piston.

2. The pressurized stem sealing arrangement of claim 1, wherein the first and second seal elements are spring biased cup seals.

3. The pressurized stem sealing arrangement of claim 2, wherein the seal packing further includes a guide bushing around the stem.

4. The pressurized stem sealing arrangement of claim 3, wherein the seal packing further includes a seal retainer washer axially adjacent each cup seal.

5. The pressurized stem sealing arrangement of claim 1, wherein the seal packing is retained in the sleeve portion by a snap ring.

6. The pressurized stem sealing arrangement of claim 1, wherein the piston includes a first and second coaxial bore, the first coaxial bore having a larger diameter for receiving the seal packing, the second coaxial bore having a smaller diameter and adjacently surrounding the stem.

7. The pressurized stem sealing arrangement of claim 6, wherein the first and second coaxial bores form a shoulder, and the seal packing abuts against the shoulder.

8. The pressurized sealing arrangement of claim 1, wherein the seal packing is in fluid communication with a sealant cavity, the sealant cavity containing seal lubricant that is pressurized by the piston acted upon by the process fluid.

9. The pressurized stem sealing arrangement of claim 8, wherein the spacer element includes a plurality of ports providing fluid communication between the lubricant cavity and the first and second seal elements.

10. The pressurized stem sealing arrangement of claim 9, wherein the piston sleeve includes at least one through-port aligned with the spacer element for providing fluid communication between the lubricant cavity and the first and second seal elements.

11. The pressurized sealing arrangement of claim 1, further comprising a removable cover enclosing the seal packing contained in the piston.

12. The pressurized sealing arrangement of claim 11, wherein the piston sleeve engages the removable cover.

13. The pressurized sealing arrangement of claim 12, wherein movement of the piston displaces the removable cover to indicate the amount of seal lubricant in the lubricant cavity.

14. The pressurized sealing arrangement of claim 11, wherein the removable cover is circular in shape for being received in a cylindrical recess.

15. The pressurized stem sealing arrangement of claim 1 wherein the sealing arrangement is arranged to seal a well head valve that is actuated with means for actuating the well head valve without releasing process fluid.

16. A regulating valve comprising:
a valve body defining a flow passage;
a valve member including a plug member situated in the flow passage and a stem extending from the plug member;
a bonnet on the valve body, the stem extending through the bonnet;
a seal arrangement retained in the bonnet, the seal arrangement including a piston surrounding the stem and statically sealed to the valve body, and a seal packing contained in the piston dynamically sealing the stem.

17. The regulating valve of claim 16, wherein the seal packing includes first and second seals spaced apart by a spacer element.

18. The regulating valve of claim 17, further comprising a sealant cavity for containing seal lubricant, the sealant cavity in fluid communication with the seal packing and pressurized by the piston.

19. The regulating valve of claim 18, wherein the piston includes a face accessing the flow passage, whereby the face is acted upon by process fluid to pressurize the sealant cavity.

20. The regulating valve of claim 19, wherein the spacer element includes a plurality of ports arranged to provide a ring of seal lubricant around the stem and to provide seal lubricant to each of the cup seals.

21. The regulating valve of claim 17, wherein the seal packing is retained within the piston by a snap ring.

22. The regulating valve of claim 16, wherein the seal packing includes a first seal, a first seal retainer washer, a spacer element a second seal retainer washer, a second seal, and a guide bushing axially arranged along the stem.

23. The regulating valve of claim 16, wherein the piston includes an indicator, the piston and indicator moveable with respect to a top surface of the bonnet to indicate the level of seal lubricant in the sealant cavity.

24. The regulating valve of claim 16, further comprising a removable cover for enclosing the seal packing.

25. The regulating valve of claim 24, wherein the removable cover is adjacent the bonnet when enclosing the seal packing.

26. The regulating valve of claim 16 wherein the seal arrangement is arranged to seal a well head valve that is actuated with means for actuating the well head valve without releasing process fluid.

27. The regulating valve of claim 16 wherein the seal arrangement is used and arranged on a natural gas petroleum well without releasing process fluid.

28. A method of sealing an elongated stem extending through a valve bonnet having a flow passage for carrying process fluids, the method comprising
inserting a seal packing into a sleeve;
retaining the seal packing in the sleeve with a retaining ring;
surrounding the stem with the sleeve such that the seal packing is fitted around the stem;
restraining the sleeve with respect to the valve bonnet such that a piston communicates with the flow passage and a cavity containing lubricant; and
lubricating the elongates stem and the seal packing with pressurized lubricant as a result of pressure exerted on the cavity from a piston.

29. The method of claim 28, further comprising covering the seal packing by placing a removable cover adjacent the valve bonnet wherein movement of the piston displaces the removable cover to indicate the amount of lubricant in the lubricant cavity.

30. The method of claim 28, further comprising monitoring the amount of sealant in the cavity by observing displacement of the piston with respect to the bonnet.

31. The method of sealing an elongated stem of claim 28 wherein the sealing packing arrangement is arranged to seal a well head valve that is actuated with means for actuating the well head valve without releasing process fluid.

* * * * *

UNITED STATES PATENT AND TRADEMARK OFFICE
CERTIFICATE OF CORRECTION

PATENT NO. : 7,059,418 B2
APPLICATION NO. : 10/715708
DATED : June 13, 2006
INVENTOR(S) : Kevin E. Greeb et al.

It is certified that error appears in the above-identified patent and that said Letters Patent is hereby corrected as shown below:

In Claim 22, Column 14, Line 13 insert a comma after the second word "element".

Signed and Sealed this

Eighth Day of August, 2006

JON W. DUDAS
*Director of the United States Patent and Trademark Office*